3,107,852
CALCULATING MACHINE
Gilman Plunkett, San Leandro, and Elwood A. Davis, Castro Valley, Calif., assignors to Friden, Inc., a corporation of California
Filed Nov. 25, 1960, Ser. No. 71,770
21 Claims. (Cl. 235—63)

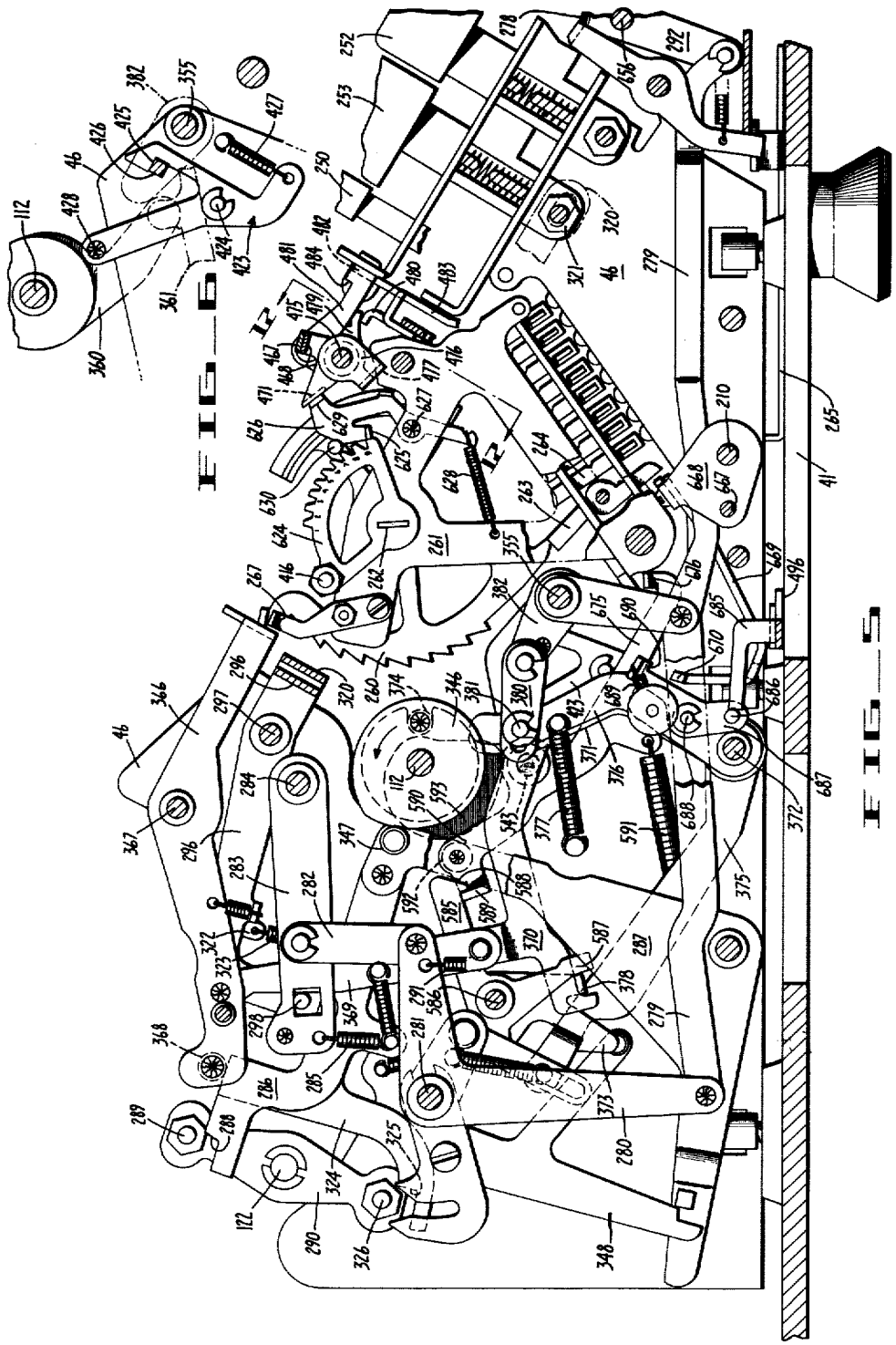

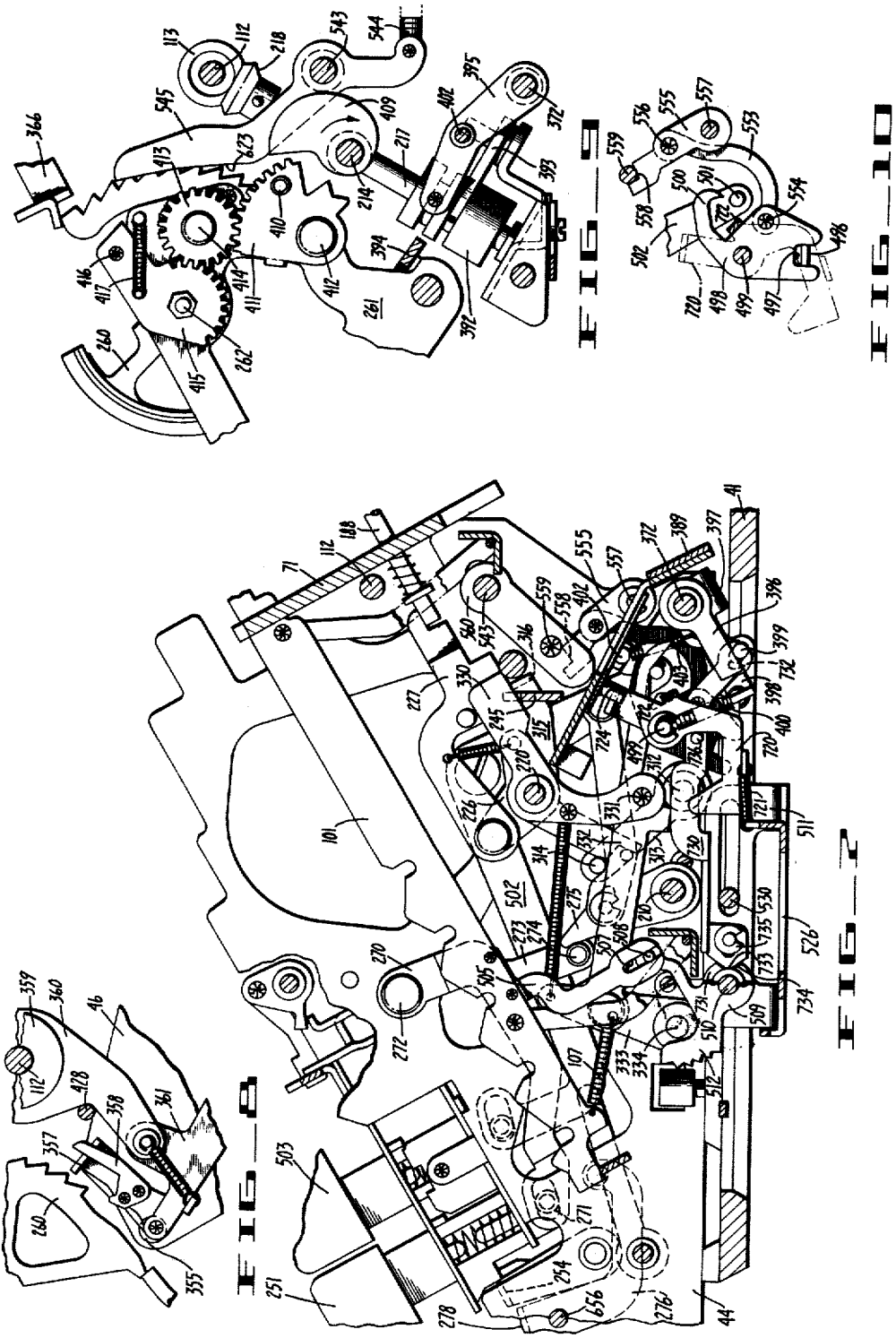

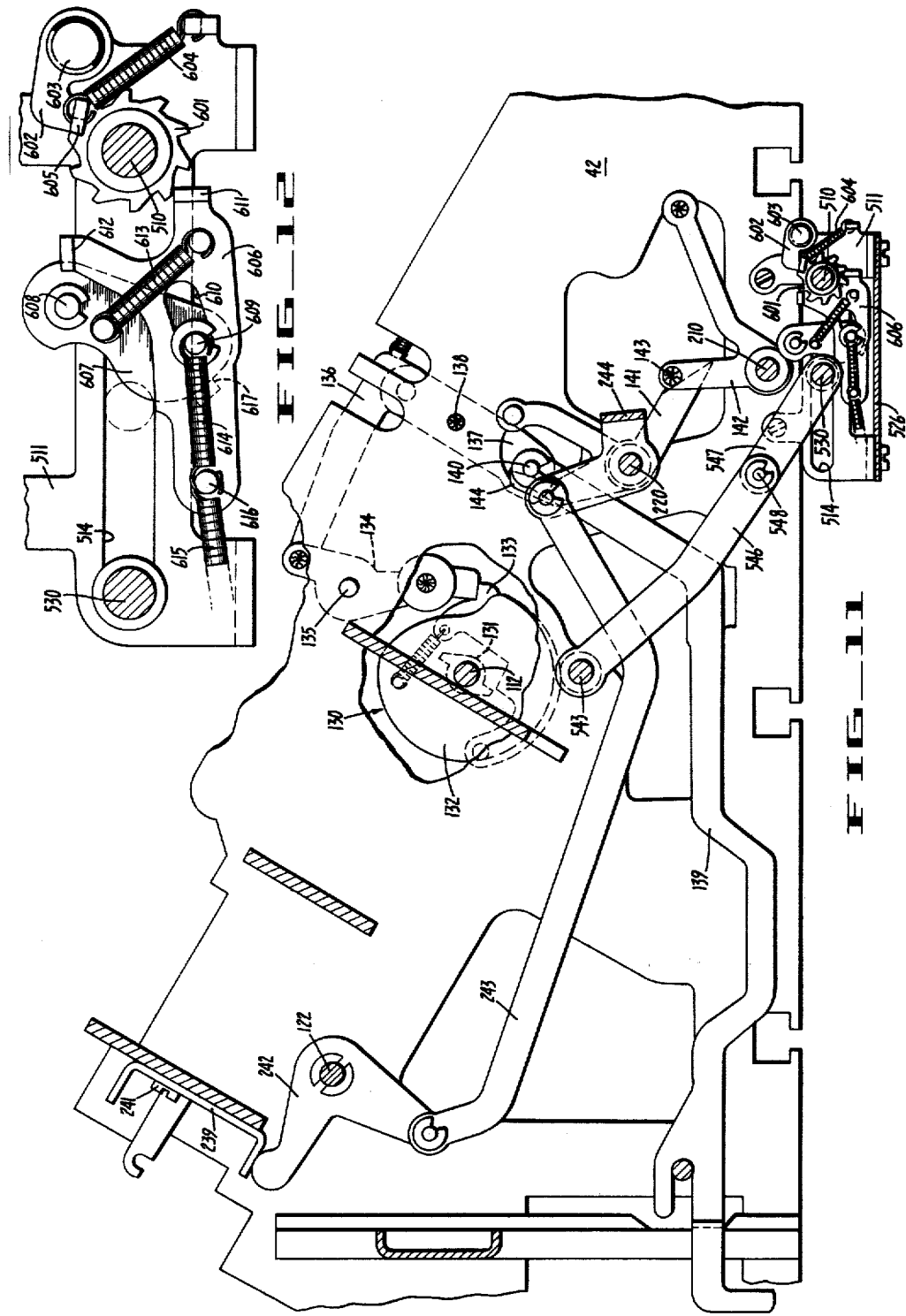

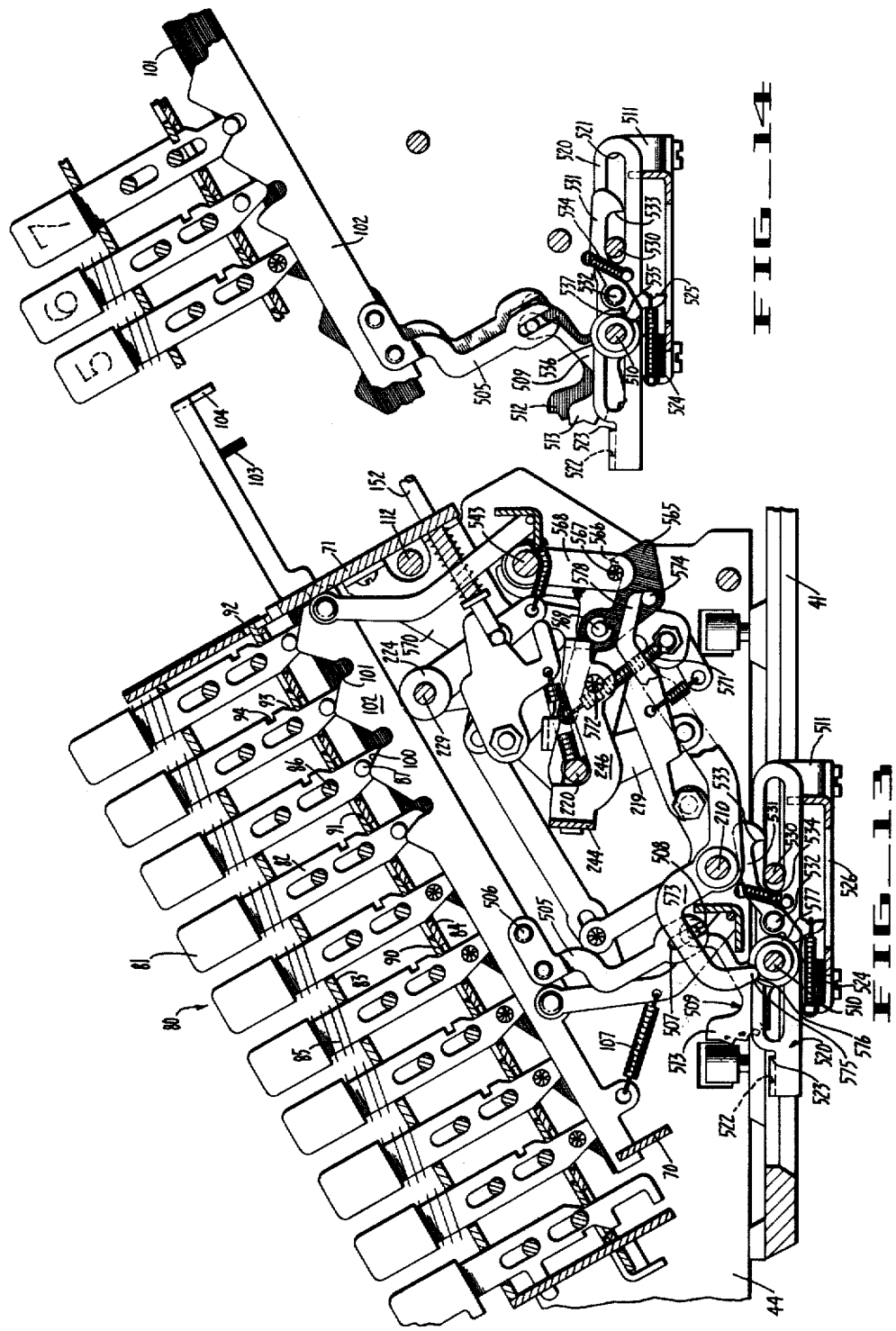

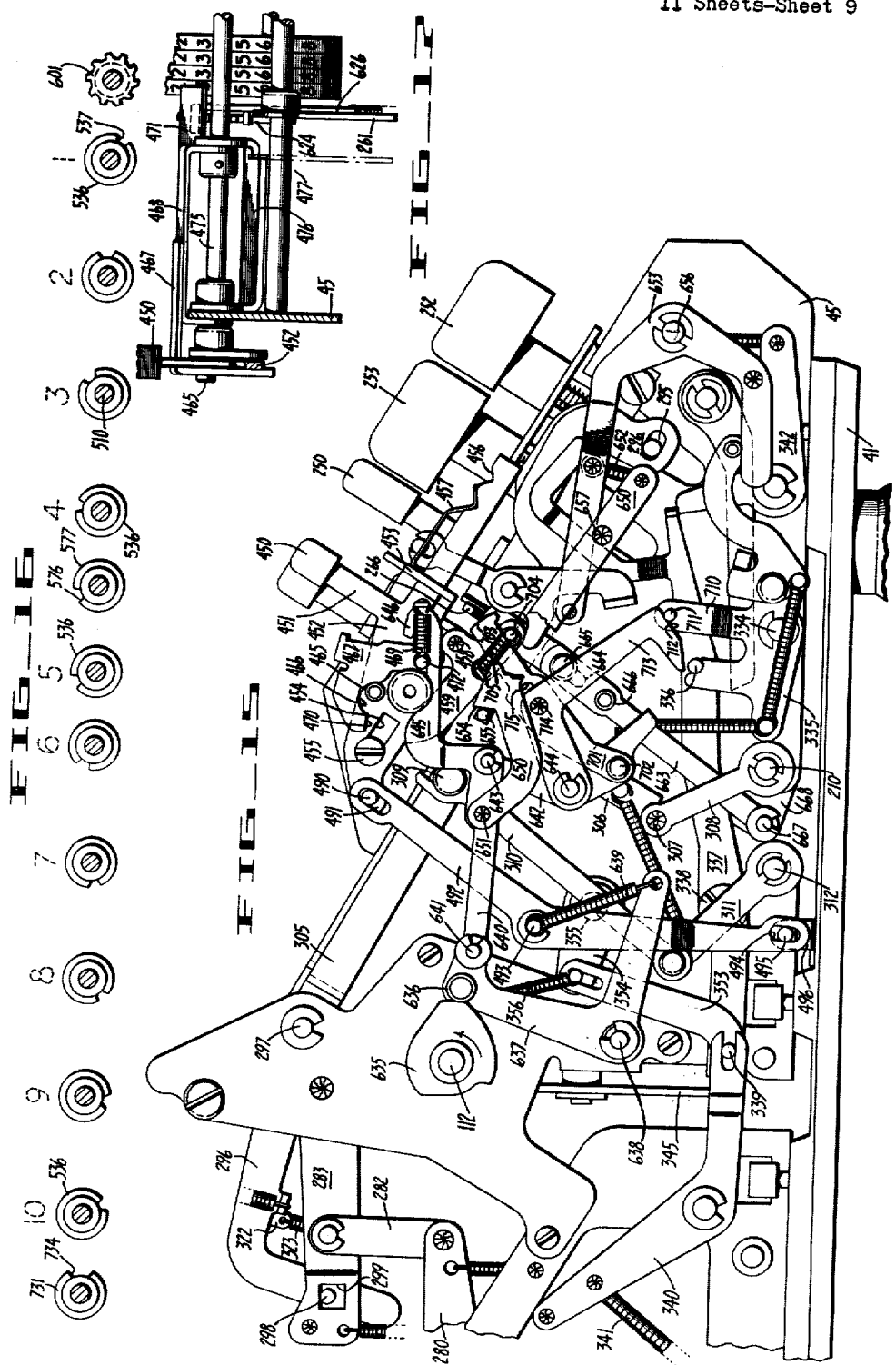

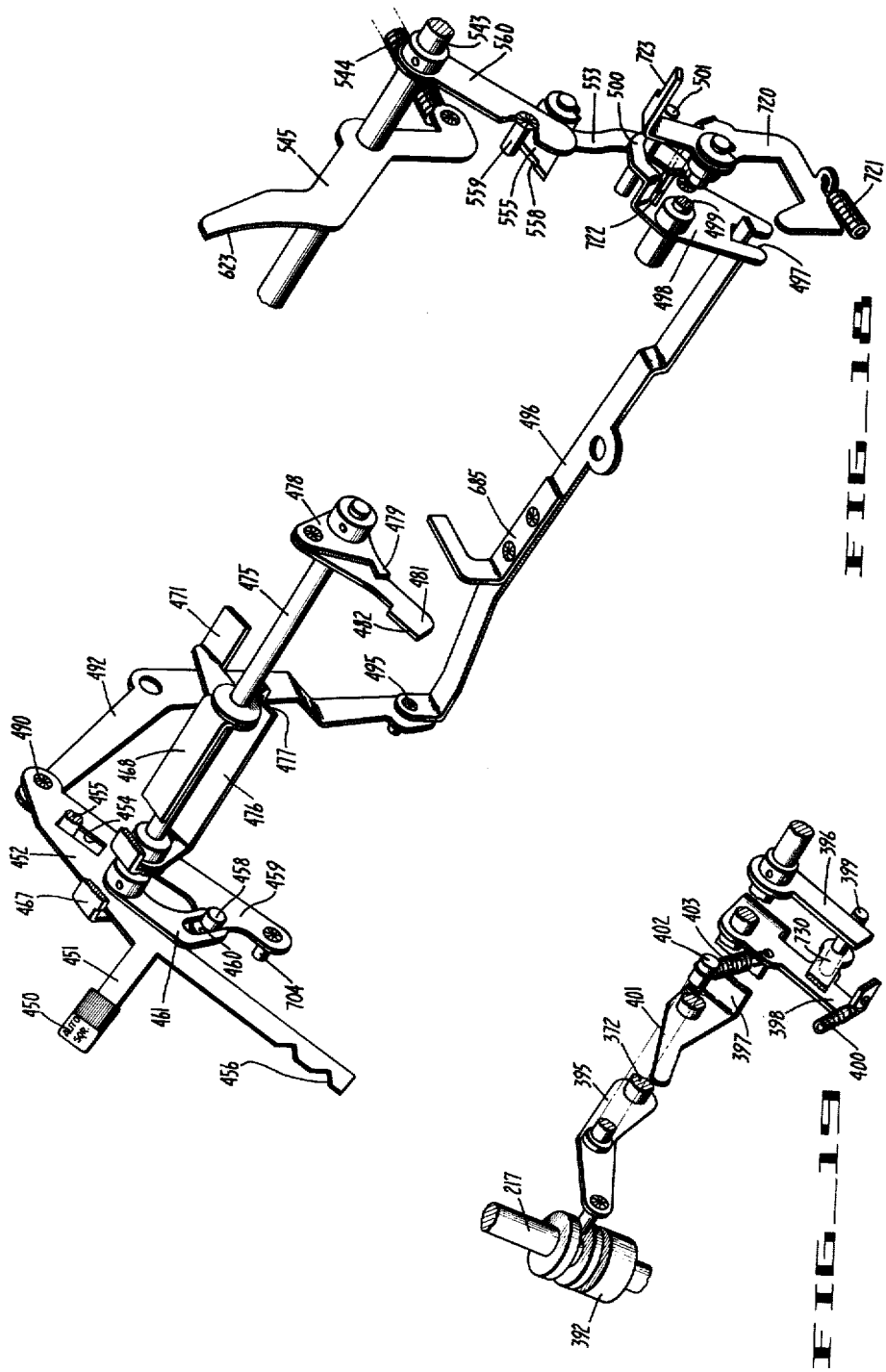

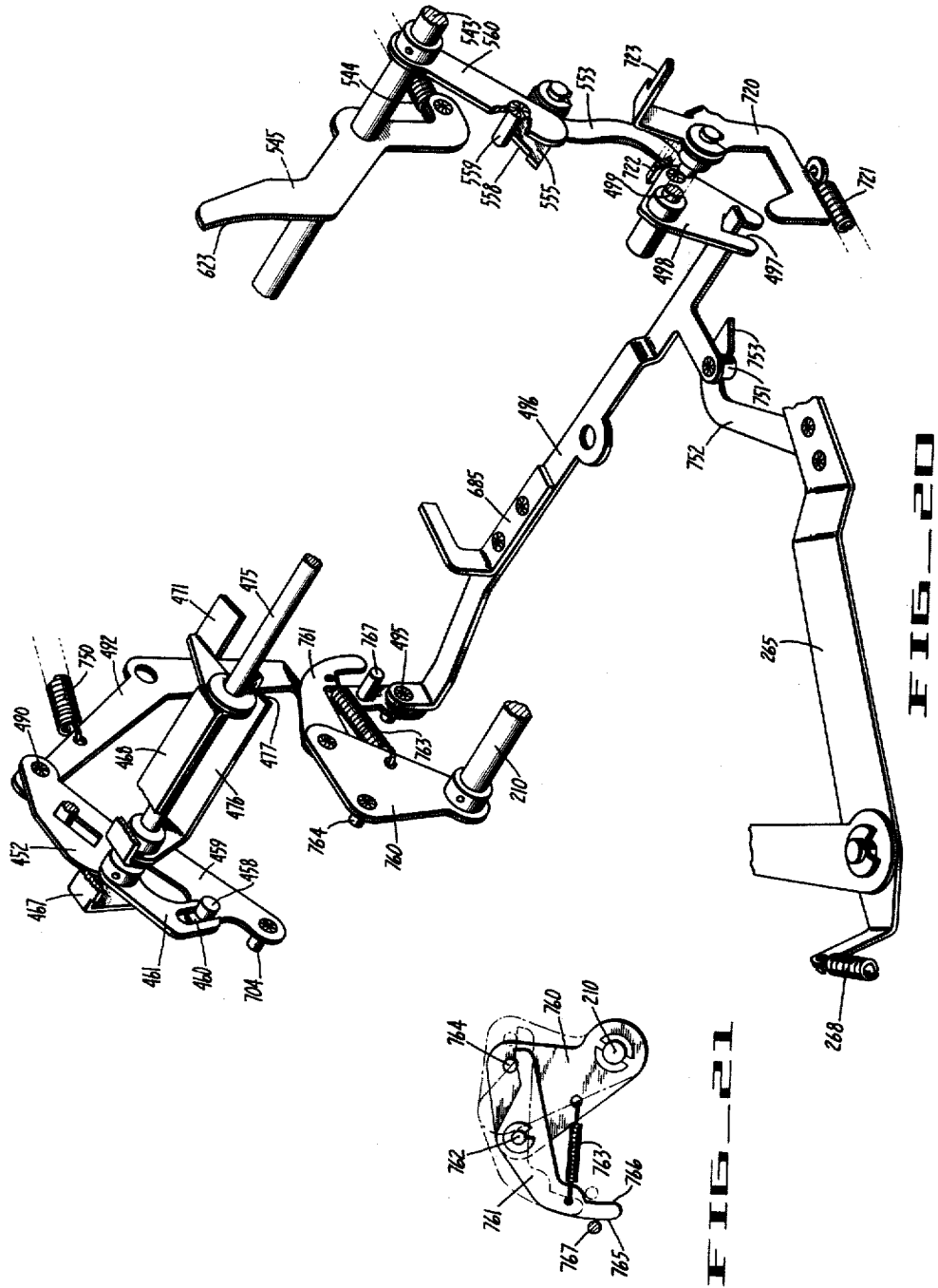

TABLE OF CONTENTS

| | Column |
|---|---|
| I. Conventional Mechanisms | 3 |
|   A. Machine Frame | 4 |
|   B. Selection and Actuation Mechanism | 5 |
|   C. Drive Mechanism | 6 |
|   D. Shifting Mechanism | 7 |
|   E. Register Clearing Mechanism | 8 |
|   F. Left Shift and Clear Programming Mechanism | 9 |
|   G. Multiplying Mechanism | 11 |
| II. Squaring Mechanism | 18 |
|   A. Manually Controlled Squaring Mechanism | 19 |
|     1. Squaring Control Key | 19 |
|     2. Ordinal Value Sensing Mechanism | 21 |
|       a. Ordinal Value Representing Members | 22 |
|       b. Ordinal Sensing Members | 22 |
|       c. Sensing Bail | 23 |
|     3. Ordinal Control of the Sensing Mechanism | 26 |
|     4. Mechanism for Setting the Sensed Value into the Multiplier Selection Segment | 27 |
|     5. Multiplier Carriage Escapement and Shift Control | 31 |
|       (a) Release Escapement Mechanism | 31 |
|       (b) Partial Multiplier Carriage Shift | 32 |
|       (c) Disable Multiplier Selection Carriage Shift Mechanism After the Initial Shift Just Described | 33 |
|     6. Restore Mechanism | 34 |
|   B. Automatic Squaring Mechanism | 35 |
| III. Operation | 36 |

This invention relates to a calculating machine, and particularly to a squaring mechanism for a conventional calculating machine, i.e., a mechanism which multiplies a factor set in a keyboard by itself.

A primary object of the present invention is to provide a relatively simple squaring mechanism, and, for purposes of illustration, is shown as associated with a calculating machine of the type disclosed in the patent to Friden, No. 2,229,889, issued January 28, 1941. However, it will be recognized by those familiar with the art that the mechanism of the present invention could readily be included in other types of calculating machines having a full keyboard. The squaring mechanism of the present invention is preferably associated with a multiplying mechanism of the type disclosed in the patents to Friden, No. 2,371,752 of March 20, 1945, and No. 2,399,917 of May 7, 1946, as, in its preferred form, our invention utilizes part of the mechanisms of those patents to control the multiplication operation.

Another object of the present invention is to provide a squaring mechanism easily and readily associated with the multiplying mechanisms of the two Friden patents last mentioned.

It is another object of the present invention to provide a calculating machine in which a factor to be squared is set in the main keyboard of the machine and, upon the initiation of a multiplication operation, the values so set in the main keyboard are sensed order-by-order and the value so sensed is used to control an ordinal multiplication operation.

Another object of the present invention is to provide a calculating machine capable of multiplying a value set in the main keyboard or selection mechanism by itself, whereby a value may be squared by inserting the value once into the main keyboard and thereafter operating a control key.

The present invention has the further advantage that we are enabled to utilize the multiplier control keys conventional in the machine of the Friden patents previously mentioned:

(a) To clear the register as an initial step of each operation;

(b) To operate without clearing the register and thereby add one squared value to another in the accumulator; or (c) To "negatively multiply" the factor set in the keyboard, without clearing the accumulator and thereby subtract one squared value from another value already in the accumulator.

Preferably the mechanism of our invention may be coupled to the conventional multiplier mechanism of the Friden patents above mentioned, so that the operator can use a conventional multiplication keyboard for ordinary multiplication operation, or can use the mechanism of the present invention to square a value set in the keyboard using many of the controls and mechanisms of the prior multiplier mechanisms.

These and other objects of our invention will be apparent from the description and claims which follow.

For purposes of disclosure the invention will be shown and described as embodied in a conventional calculating machine manufactured in accordance with the teachings of the Friden patents above-mentioned. It will be understood, however, that the invention is not limited to incorporation in such a machine, for it can be incorporated in, or applied to, other commercial calculating machines on the market. Therefore, the machine shown in the accompanying drawings and described herein is to be considered as a preferred embodiment, used only for the purposes of exemplification, for the invention is not limited to the machine so shown.

Parts of the mechanism disclosed in the above patents, which are associated with the mechanism of this invention, are disclosed herein in order to show the environment of the novel structure of the present invention. It will be understood that in these views many mechanisms and parts not associated with the mechanism of this invention are eliminated for simplification—only those parts being retained which cooperate with the novel mechanism of this machine. Such conventional mechanisms will be described as briefly as possible and yet explain the novel mechanism of our invention and to illustrate its operation. For a full disclosure of any of these mechanisms shown and herein briefly described, or for related mechanisms not shown or described, reference is made to the above-mentioned patents, or others which may be mentioned hereafter.

It is believed that the invention will be more readily understood by reference to the drawings which form a part of this specification, and in which:

FIG. 5 is a left side view of the multiplier control mechanism of the machine with which our invention is preferably associated, taken along a longitudinal, vertical plane immediately to the right of the left side control plate, such as along the plane indicated by the line 5—5 of FIG. 1;

FIG. 6 is a detail of a delay latch mechanism for latching the conventional multiplier mechanisms in an inoperative position for a brief portion of a machine cycle in multiplying operations;

FIG. 7 is a right side view of the multiplier control mechanism, such as taken along the longitudinal, vertical plane indicated by the line 7—7 of FIG. 1;

FIG. 8 is a detail of the conventional multiplier counting mechanism of the machine with which this invention is preferably associated;

FIG. 9 is another detail of the multiplier mechanism with which the present invention is associated, and shows particularly the means for restoring the multiplier selection segments, or control members, to their "0" positions at the end of the multiplication operation;

FIG. 10 is a detail of a latch mechanism associated with the present invention;

FIG. 11 is a left side view of the right side frame plate, such as a view taken along the longitudinal, vertical plane indicated by the line 11—11 of FIG. 1, and shows particularly the drive mechanism for the machine and the means for selecting the order in which the multiplication operation is to be effected;

FIG. 12 is an enlarged detail of the squaring control mechanism shown in the lower right-hand part of FIG. 11;

FIG. 13 is a right side view of the selection mechanism of the machine of the present invention, such as taken along the longitudinal, vertical plane indicated by the line 13—13 of FIG. 1, and shows particularly the mechanism for sensing the values standing in the associated order of the keyboard;

FIG. 14 is a view of the sensing mechanism shown in FIG. 13, but showing the position of the parts upon the selection of a value of "7" in the order shown;

FIG. 15 is a left side view of the left side control plate showing the multiplication and squaring mechanisms, such as one taken along the longitudinal, vertical plane indicated by the line 15—15 of FIG. 1;

FIG. 16 is a detailed view of the control cams extending across the front of the machine which severally control the ordinal multiplication operations;

FIG. 17 is a front detail view of the squaring controls associated with the multiplying mechanism, such as taken along the transverse plane indicated by the line 17—17 of FIG. 5;

FIG. 18 is a perspective view of the control mechanism associated with one embodiment of the present invention;

FIG. 19 is a detailed perspective view of the shift control mechanism associated with our invention;

FIG. 20 is a perspective view (similar to FIG. 18) of the control mechanism associated with the preferred embodiment of the present invention; and FIG. 21 is a detailed view of a latch mechanism shown in FIG. 20.

I. CONVENTIONAL MECHANISMS

The present invention, in its preferred form, is an improvement on a calculating machine of the type disclosed in the above-mentioned patent issued to Carl M. Friden, No. 2,229,889, as modified by the multiplier mechanism shown in his Patents Nos. 2,371,752 and 2,399,917. It will be understood, however, that the multiplying mechanism of the present invention is not necessarily combined with such a machine, or the conventional multiplier mechanisms, for the present invention, per se, constitutes an improved squaring mechanism. It is, however, readily adapted to the well-known multiplier mechanism of the patents mentioned, and, in its preferred form, constitutes an improvement thereover.

A. Machine Frame

Figure 1:
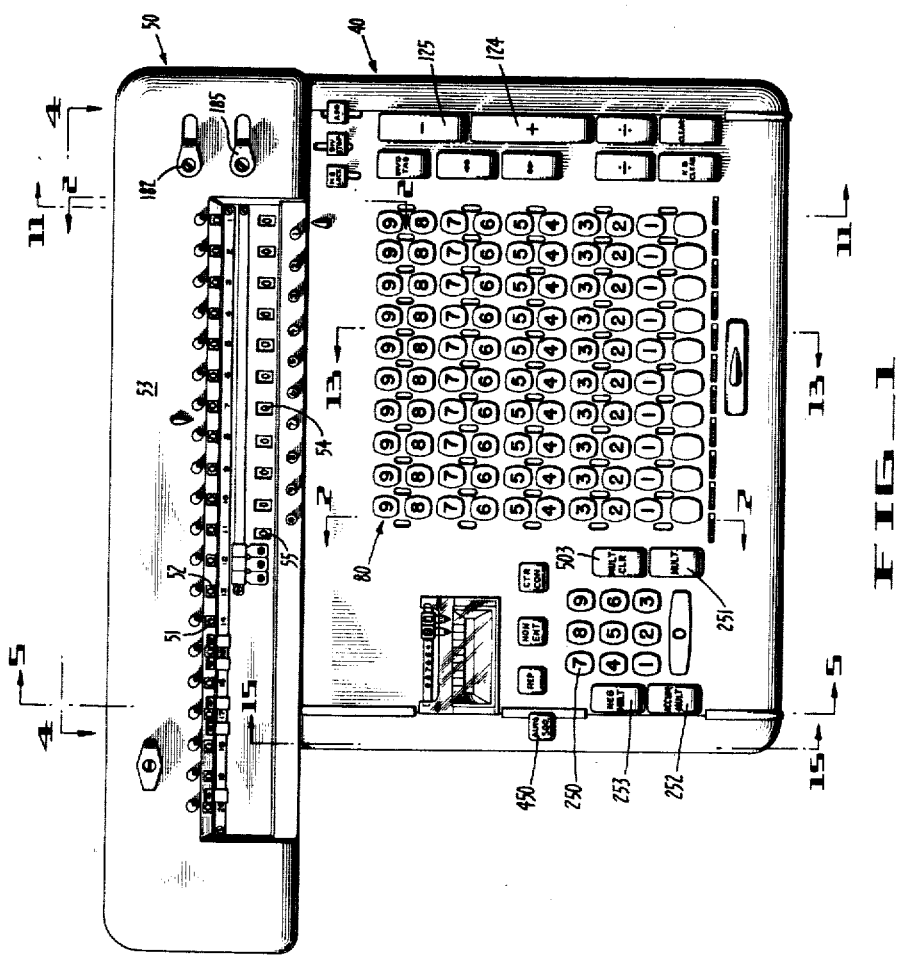
FIG. 1 is a plan view of the machine manufactured in accordance with the teachings of the Friden patents above-mentioned, as modified for one embodiment of our invention.

The preferred type of machine with which the present invention is associated is shown in FIG. 1. Machines of this type are generally constructed in two sections: a frame portion 40 and a shiftable register carriage 50, as shown particularly in this figure. The frame portion, insofar as the present invention is concerned, generally comprises a base plate 41 (FIGS. 5, 7, 13 and 15). A plurality of vertically and longitudinally extending frame plates is mounted on the base 41, such as a right side frame plate 42 (FIGS. 3, 4 and 11); a left side frame plate 43 (FIGS. 2, 3 and 4); an intermediate frame plate 44 (FIGS. 3, 7 and 13), which lies in the forward portion of the machine and supports the left side of the keyboard and the right side of the multiplier mechanism; a left side control plate 45 (FIG. 15), which supports a major portion of the multiplier control mechanisms; and an auxiliary left side frame plate 46 (FIG. 5), which lies between the left side frame plate 43 and the control plate 45 and supports a portion of the multiplier mechanism and controls associated therewith. The framework also comprises a number of crossbars which hold the two main frame plates 42 and 43 in rigid relationship, such as the forward crossbar 70 (FIG. 13), front bearing plate 71 (FIG. 2), intermediate bearing plate 72, a bearing bracket 73, and a rear bearing plate 74. The rear bearing plate 74 carries a bearing bracket 75 which supports the carriage, as will be mentioned in the next paragraph. A crossbar 76 mounted at the top of the frame section immediately in front of the carriage 50 completes the framework of the machine. This framework carries the selection mechanism, the actuators, the drive mechanism therefor, and various control keys, as well as the carriage shifting mechanism and register clearing mechanism.

The carriage 50 contains an ordinally arranged accumulator register comprising the accumulator dials 51, which are viewable through windows 52 in the carriage cover 53; and a counter, or quotient, register comprising the ordinally arranged counter dials 54, which are viewable through windows 55 in the carriage cover. The carriage is shiftable with respect to the frame 40, so that the various orders of the accumulator dials 51 and counter dials 54 can be aligned with different orders of the selection mechanism for such operations as multiplication or division. The carriage, as shown particularly in FIG. 2, includes a main frame bar 56, which is slidingly supported upon the bearing bracket 75 affixed to the rear cross plate 74; a front carriage rail 57, which rides upon suitable bearings 58 mounted on crossbar 76; and a pair of end plates 59 which hold the frame bar and front carriage rail in spaced and parallel relationship. Mounted in the main carriage frame bar 56 is a plurality of ordinally arranged dial shafts 61, upon the upper ends of which (above the frame bar) are mounted the respective accumulator dials 51. The respective dial shafts are also provided with an accumulator drive gear 62 mounted on the lower end of the shaft (below the frame bar). This mechanism is provided with a tens-transfer mechanism which is adequately disclosed and described in the Friden Patent No. 2,229,889, which, since it forms no part of the present invention, need not be described here. It can be mentioned here that the counter dials 54 are mounted upon ordinally arranged shafts 63, the rear ends of which are journalled in the frame bar 56 and the front ends of which are journalled in the front carriage rail 57. The several counter dials are actuated by gears 64 rigidly secured thereto, which are actuated by a counter actuator 65 which is adequately described in the above-mentioned Friden Patent No. 2,229,889. Since this counter mechanism forms no part of the present invention, it need not be described here.

B. *Selection and Actuation Mechanism*

Figure 2:
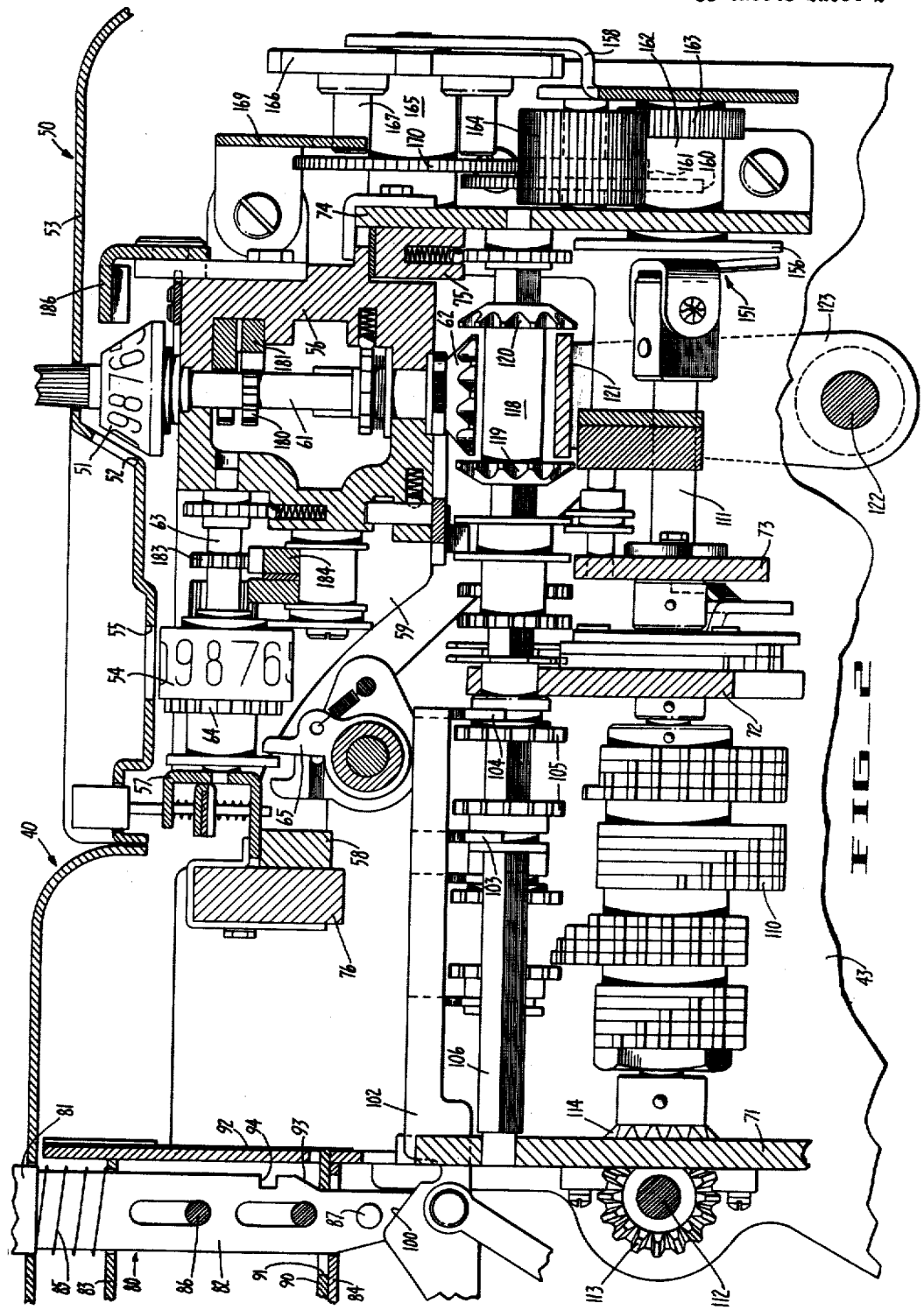
FIG. 2 is a cross-sectional view of the machine shown in FIG. 1, showing particularly a conventional Thomas-type actuator, the selection mechanism, and the accumulator register, such as would be seen in a view taken along a longitudinal vertical plane immediately to the right of the lowest order thereof, as indicated by the line 2—2 of FIG. 1.

Numerical values may be selected for entry into the accumulator register dials 51 by the depression of appropriate numeral keys 80 of a conventional "full keyboard," the keys of which are arranged in longitudinally extending ordinal rows and transverse value banks, as shown in FIG. 1. The individual keys of the keyboard (as best shown in FIGS. 2 and 13) generally comprise a key top 81, which is solidly mounted on a key stem 82. The keys are severally mounted in a keyboard frame, which includes top plate 83 and bottom plate 84, the key stems being inserted through registering slots in the two plates. The keys are severally biased to a raised position by conventional springs 85 surrounding the key stems 82 and seated upon the top of the top frame plate 83 and against the lower face of the corresponding key top 81. In our preferred construction the keys of each bank are slidably mounted upon a pair of tie rods 86.

A series of ordinal key latches 90 is associated with the respective orders of the keyboard—the latches being slidably supported on the top face of the lower keyboard plate 84. Each of the latches 90 is provided with a series of ten notches 91 through which the ten value keys ("0" to "9") are inserted. The latches are severally biased forwardly by a leaf spring 92 mounted on the rear wall of the keyboard frame plate. The key stems 82 are provided with a cam face 93 which, upon depression of the key, force the associated ordinal latch 90 rearwardly. A notch 94, located slightly above the cam face on the "1" to "9" keys, is adapted to engage the ordinal latch 90 when the notch registers with the latching slide. Thus, a key that is depressed to its full value position is latched in that depression by the latching slide 90 engaging the notch 94 of the depressed key. It can be mentioned that the key is held depressed until released by a keyboard clearing mechanism not here pertinent, but described in the patents heretofore mentioned.

Each of the key stems 82 is provided with a laterally extending pin 87 located adjacent the lower end thereof. These pins are adapted to engage the differentially angled cam faces 100 of the conventional V-notches of the selection bars 101 and 102. In the machine of the Friden patents above-mentioned two selection bars are used with each order of the machine—the bar 101 serving the "1" to "5" keys and the bar 102 serving the "6" to "9" keys, as is best shown in FIG. 13. Each of the selection bars 101 is provided with a laterally extending yoke 103 and the selection bars 102 are provided with a similar laterally extending yoke 104. These yokes respectively engage an annular notch in the hub of a ten-tooth selection gear 105 (as is best shown in FIG. 2). Both of the selection gears of each order are mounted upon a common square, or selection, shaft 106 which is journalled in the bearing plates 71, 72 and 74. Thus, the differential angle of the cam faces 100 of the V-notches of the respective selection bars provide a differential longitudinal, or axial, movement of the selection gears 105 along their respective square shafts 106, as is well-known in this art.

Associated with the selection gears 105 are conventional Thomas-type actuators 110. These actuators are mounted upon longitudinally extending actuator shafts 111, which are constantly geared to a common drive shaft 112 through miter gearing 113, 114. It is conventional in machines of this type to rotate the drive shaft 112 through a complete revolution with each cycle of the machine, and the gearing is such that the actuators 110 likewise perform one complete revolution. The actuators, as is conventional, are provided with nine differentially stepped teeth which are adapted to engage the teeth of the selection gears 105 for differential movement of the latter, corresponding to the axial position of the selection gears on their square shaft 106. Thus, the positioning of the selection gears 105 on the square shaft 106, from depression of a value key, will cause, when the shaft 112 is rotated, a differential rotation of the square shaft 106 for a corresponding angle.

Adjacent the rear of each square shaft 106 is a digitation control, or, as it is commonly called, a "plus-minus," spool 118. This spool is provided with a plus gear 119 and a minus gear 120, both of which are adapted to mesh with the ordinally related dial gear 62 when the sleeve 118 is displaced from the central position shown in FIG. 2. The spool is slidably mounted on the square shaft 106 and can be adjusted longitudinally of that shaft by means of a digitation control bail 121, which is mounted on a digitation control shaft 122, as by conventional arms 123. The shaft 122 can be rocked, and consequently the bail, or gate, 121 can be shifted to position the spool 118 in either the additive or the subtractive position by various operation control keys, such as the plus key 124 (FIG. 1) or the minus key 125. Since the various digitation control keys, other than those relating to multiplication operations, play no part of the present invention, such mechanisms will not be described herein, but reference can be made to the Friden Patent No. 2,229,889 for a full disclosure thereof. The control of this shaft from the multiplication control keys will be described subsequently in relation to the control of multiplication operations under Section G, entitled "Multiplying Mechanism."

C. *Drive Mechanism*

The main drive shaft 112 of the preferred form of our machine is driven by an electric motor and connecting gearing (neither of which is shown herein, but both of which are fully described in the patents above-mentioned) through the medium of a conventional clutch 130 (FIG. 11). The driving gear train just mentioned includes a gear and integral ratchet 131 rotatably mounted on the right end of the drive shaft 112. The driven member of the clutch is a disk, or plate, 132 which is rigidly secured to the shaft 112. This plate carries a clutch dog 133, which is resiliently biased to engagement with the ratchet portion of the gear 131, so that when the clutch dog 133 is released by a clutch control lever 134, the engagement of the dog with the rachet causes the driving gear 131 to impart like rotation to the plate 132, and hence to the drive shaft 112.

The clutch control lever 134 is pivotally mounted on the right side frame plate 42 by any suitable means, such as stud 135, and is operated by means of a link 136. This link is operated by various control keys of the machine, but the only one of interest in the present invention is through the means of a lever 137, likewise pivotally mounted on the right side frame plate 42 by any suitable means, such as stud 138. The lower end of this lever is connected to a motor switch control rod 139 by means of a long pin 140 which extends through an aperture in the frame plate, as shown in FIG. 11. Obviously, any rocking of the lever 137 (counter-clockwise in FIG. 11) imparts a similar rotation to clutch control lever 134, thereby disengaging the clutch control lever from the clutch dog 133 and enabling the clutch dog to engage the drive ratchet. Such motion of the lever 137 likewise imparts forward movement to the switch control rod 139, thereby closing the switch and starting the motor. In the present invention this movement is secured by the rocking of a lever 141, which is pivotally mounted on a transverse shaft 220 extending across the machine. The lever, in turn, is operated by rocking of an arm 142, which is rigidly mounted on a second transverse shaft 210. The arm 142 carries a pin 143 which engages a cam edge on the forwardly extending arm of the lever 141, so that the rocking of shaft 210 (counter-clockwise in FIG. 11) rocks the lever 141 in the opposite direction. Thereupon a hook extension 144 on the rear end of the lever 141 engages the pin 140 to impart the necessary rocking to lever 137 and the forward translation of switch control link 139. The rocking of the shaft 210 will more logically be described in connection with the control keys of the multiplier mechanism, and hence such a description will be found under the heading of "Multiplying Mechanism" in Section G.

D. *Shifting Mechanism*

Figure 3:
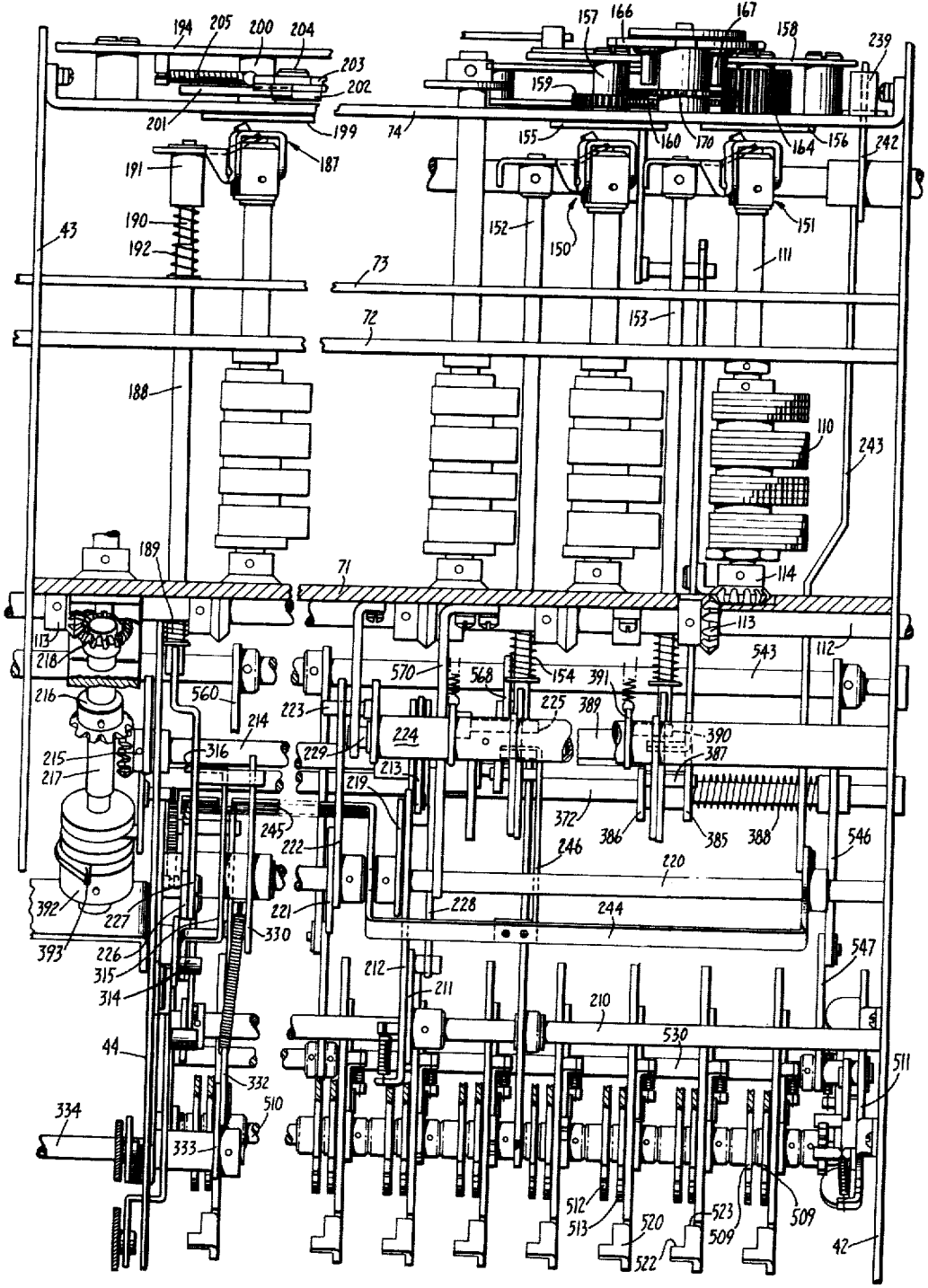
FIG. 3 is a cross-sectional plan view of the machine shown in FIG. 1, showing particularly the actuating mechanism, register shifting means, and register clearing mechanisms of a conventional Thomas-type machine, together with the means for sensing the ordinal values standing in the keyboard, taken along a plane parallel to the keyboard of the machine and immediately below it.
Figure 4:
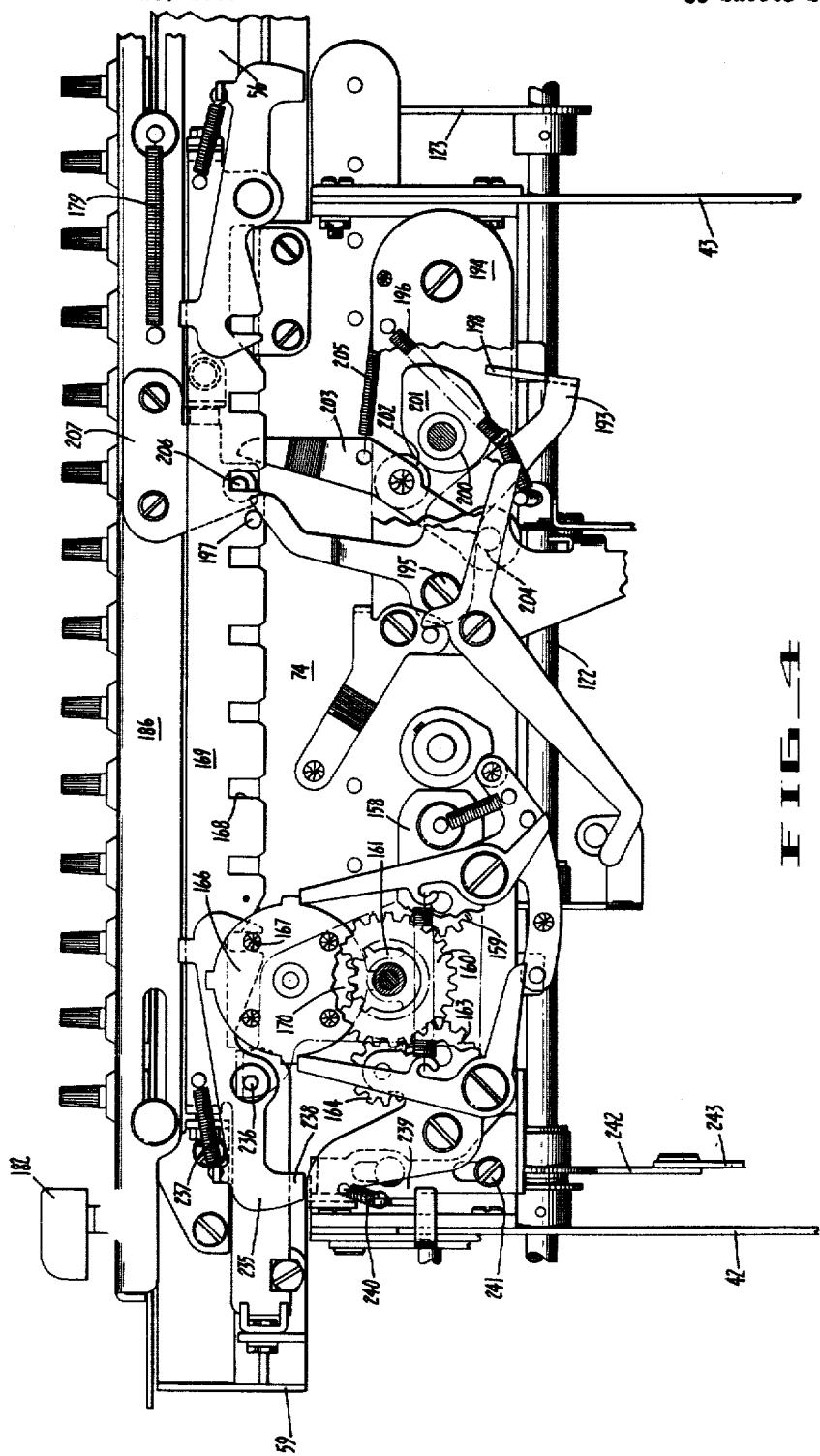
FIG. 4 is a rear view of the machine shown in FIG. 1, with the covers removed, such as a view taken along a transverse plane substantially perpendicular to the plane of FIG. 3, as indicated by the line 4—4 of FIG. 1.

It has already been mentioned that the carriage 50 is shiftable transversely of the frame 40 of the machine in order to permit operation of various orders of accumulator dials 52 by the selection and actuation mechanism heretofore described. This mechanism is best shown in FIGS. 2, 3 and 4 and is essentially that shown in the patent to Carl Friden, No. 2,313,817, issued March 16, 1943, as modified by the patent to Morton Matthew, No. 2,679,916 of June 1, 1954. It will be recalled that the actuator shafts 111 all rotate synchronously in the same direction (counter-clockwise when viewed from the front of the machine), and each makes a complete revolution with each revolution of the main drive shaft 112. Leftward shifting of the carriage is conventionally controlled by a left shift clutch 150 (FIG. 3), the driving portion of which is mounted on the rearward end of the second drive shaft 111 from the right; and rightward shifting of the carriage is controlled by a similar clutch 151, the driven member of which is mounted on the rear end of the rightmost actuator shaft 111. Preferably the shift clutches are of the type disclosed in the patent to Matthew, No. 2,679,916, issued June 1, 1954. The operation of these clutches is controlled by the positioning of a left shift control bar 152 and a right shift control bar 153, respectively. These control bars are both biased toward the front end of the machine by a spring 154 surrounding the front end of the bar and seated between the front bearing plate 71 and a collar adjacent the front end of the bar. Both are axially movable toward the rear of the machine by various control means, none of which are important to the present invention except the one relating to the multiplying mechanism, and that can best be described in connection with the multiplier controls.

Associated with each of the clutch drivers 150 and 151 is a notched plate 155 and 156, respectively, adapted to be engaged by the rockable tongue of the associated clutch driver. The disk 155 is mounted on the forward end of a spool 157 journalled in the rear bearing plate 74 and a bracket 158 (see also FIGS. 2 and 4). This spool carries a gear 159 which meshes with the enlarged section 160 of a compound gear 160, 161. The disk 156 associated with the clutch driver 151 is similarly mounted on a spool 162 journalled in the rear bearing plate 74 and bracket 158, and carries gears adjacent its rear end a gear 163. The gear 163 lies rearwardly of the plane of the gear 160 but is entrained with the latter through a wide idler 164, as best shown in FIG. 2. Thus, while both shafts 111 and the two clutch drivers 150 and 151 mounted thereon rotate in the same direction, the gear trains connected with the disks 155 and 156 are effective to reverse the rotation of the compound gear 160, 161. The small gear section 161 of the compound gear meshes with a shift gear 170, which is rigidly mounted on a spool 165, likewise journalled in the rear bearing plate 74 and the bracket 158. This spool also carries a shift plate 166 rigidly mounted thereon, which plate carries four equiangularly spaced pins 167 extending forwardly therefrom. These pins are adapted to engage ordinally spaced notches 168 in a shift rack 169 mounted on the rear of the carriage frame bar, as is best shown in FIGS. 2 and 4. Hence, the rotation of the disk 166 in either direction, as determined by the operation of the shift clutches 150 or 151, is effective to selectively shift the carriage 50 in a selected direction.

E. *Register Clearing Mechanism*

The register clearing mechanism utilized in the machine with which our invention is preferably associated is described in a number of patents, and particularly the one to Friden, No. 2,229,889 already mentioned. Briefly, it comprises a mutilated clearing gear 180 (FIG. 2) mounted on each accumulator dial shaft 61. These gears are adapted to be engaged by a mutilated clearing rack 181 upon longitudinal displacement of the rack to the right, as by means of the conventional clearing knob 182 (see FIG. 1). Similarly, the counter dials are cleared by means of a mutilated clearing gear 183 (FIG. 2) on each dial shaft 63 adapted to be engaged by the teeth of a mutilated clearing rack 184 upon movement of the latter to the right, as by the manual operation of its clearing knob 185 (FIG. 1).

It is also conventional in the machine with which our invention is preferably associated to provide means for clearing either or both registers by power by various means, one of which will be described in the next section. This power operation of the clearing mechanism is conventionally secured by the translation of a power-operated clearing bar 186 (FIGS. 2 and 4), which is slidably mounted on the upper rear corner of the carriage frame bar 56. This bar is normally biased toward the left (to the right in FIG. 4) by a spring 179, and can be shifted to the right by a cam-driving means to be described in the succeeding paragraphs. For the moment it can be mentioned that the right-hand end (to the left in FIG. 4) carries a bracket (not shown in these figures but described and shown in the patent to Friden No. 2,294,083, issued August 25, 1942), which bracket is adapted to engage arms carried by the respective clearing knobs, whereby either clearing rack can be selectively disengaged or engaged, at the will of the operator.

The rack is operated through the medium of a clear clutch driver 187 (FIG. 3), such as the clutch driver described in the patent to Matthew No. 2,679,916 of June 1, 1954. This clutch driver is controlled by the operation of a telescoping bar 188, which is biased toward the front of the machine by a suitable compression spring 189 seated around the forward end of the bar between the front bearing plate 71 and a collar carried by the bar. The rear end 190 of the bar carries a clutch operator 191. A spring 192, seated between the clutch operator member 191 and a collar carried by the forward portion of the bar, holds the operator at the extended position—which, in the normal forward position of the bar 188, holds the clutch driver inoperative. It can be mentioned here that normally (so long as the carriage 50 is in any ordinal position other than the extreme left-hand position shown in FIG. 1) the clutch operator is locked forwardly in an inoperative position by means of a bellcrank latch lever 193 (see FIG. 4). The bellcrank latch is pivotally mounted on a bracket 194 mounted on the rear bearing plate 74 by any suitable means, such as screw studs 195. The bellcrank latch is resiliently biased to a blocking position by any suitable means, such as a spring 196 tensioned between an ear on the lower arm of the lever and a pin on the bracket 194. The bellcrank, however, can be rocked (clockwise in FIG. 4) by a pin 197 carried by the shift rack 169 and so positioned that it engages the upper arm of the bellcrank 193 only as the carriage rack (and consequently the carriage) is shifted from its next to the extreme left-hand position to its extreme left-hand position. When the bellcrank 193 is so rocked (clockwise in FIG. 4), the forwardly projecting finger 198, which normally registers with the clutch operator 191, is rocked away from engagement with the clutch operator. If, at that moment, the clearing bar 188 (FIG. 3) is in its rearward operative position, the clutch operator 191 then becomes effective to so position the clutch driver 187 that it will engage its driven member, or disk, 199. The driven disk 199 is rigidly mounted on a spool 200 which is journalled on a shaft mounted in the rear bearing plate 74 and the bearing bracket 194. The spool 200 also carries a clearing cam 201 (best shown in FIG. 4) that is rigidly mounted thereon. A follower arm 203 is associated with the clearing cam 201, the arm carrying a follower roller 202 that engages the periphery of the cam. The follower arm is pivotally mounted on the rear bearing plate 74 by any suitable means, such as stud 204, and is biased into engagement with the cam 201 by a suitable spring 205. The upper end of the follower arm 203 engages a pin 206 carried by a bracket 207 mounted on the clear bar in such a position that the arm 203 will engage the pin 206 when, and only when, the carriage 50 is in its extreme left-hand position, shown in FIGS. 1 and 4.

F. *Left Shift and Clear Programming Mechanism*

It is customary in the machine with which our invention is preferably associated, to shift the carriage 50 to the extreme left-hand position (shown in FIG. 1) and to normally operate the clearing mechanism, from the depression of any of the multiplier control keys. This is secured, in the preferred machine, by the rocking of a transversely extending initiating shaft 210 (FIGS. 3 and 11). The rocking of this shaft (counter-clockwise in FIG. 11) is effective to initiate machine operation, as has already been described under the heading of "Drive Mechanism." Such rocking of this shaft also is effective to operate a programming mechanism. This programming mechanism is best shown and described in the patent to Machado No. 2,650,761, issued September 1, 1953, but enough is shown in FIG. 3 to briefly describe this mechanism. The shaft 210 is rocked by the multiplier control keys, as will be discussed under the heading of "Multiplying Mechanism" in the next section. For the moment, it can be noted that the shaft 210 carries an arm 211 rigidly mounted thereon. The arm, in turn, supports the forward end of a link 212, the rear end of which is connected to one arm of an eccentrically mounted bellcrank 213. The bellcrank is rotatably mounted on an eccentric carried by auxiliary drive shaft 214, which is directly geared to the main drive shaft 112, as by means of miter gears 215, 216, an intermediate shaft 217, and a miter gear 218 which meshes with the highest order miter gear 113 on the main drive shaft 112. Thus, the eccentric 213 oscillates constantly during machine operation. In most operations such oscillation is of no importance, as the bellcrank 213 is so angularly positioned that it is ineffective upon the parts associated with it. However, when the bellcrank is rocked, by means of arm 211 and link 212 upon rocking of shaft 210, a hook on one of its arms, at the extremity of its stroke, is adapted to catch a pin carried by an arm 219 rigidly mounted on shaft 220. When the eccentric 213 is so rocked and the arm 219 is so hooked, the shaft 220 is rocked from the oscillation of the eccentric. The shaft 220 carries a second arm 221 pinned thereto. This arm 221 carries a pivotally mounted pusher link 222, the rear end of which is provided with a suitable shoulder that engages a pin 223 mounted on an arm which forms the left end of a spool 224. The spool 224 is pivotally mounted on a transverse shaft 229 journalled in a bracket extending from bearing plate 71. The right end of the spool 224 is formed as an arm which carries a rightwardly extending pin 225 which engages the front arm of the left shift control rod 152. Thus, rocking of the shaft 220 is effective to rock the spool 224 (counter-clockwise when viewed from the right) and thereby translate the shift control rod 152 rearwardly and initiate a leftward shifting of the carriage.

The shaft 220 also carries an arm 226 adjacent the left end thereof, the arm being rigidly mounted on the shaft. This arm likewise supports the forward end of a pusher link 227, the rear end of which is provided with a shoulder engaging the forward end of the clear clutch control rod 188. Hence, the rocking of the shaft 220 is also effective to translate the clear clutch control rod 188 rearwardly, although the telescoping operator 191 on the rear end thereof is held forwardly by the latching means previously described. It can be noted here that the programming mechanism just described is latched in an operative position by a latch member 228 which is disabled when the shaft 210 and arm 211 are returned to their original position, as the arm 211 carries a pin which releases the latch. The left shift and register clearing mechanisms are latched in an operative position so long as the shaft 210 is rocked, and it can be mentioned here that the shaft is held in a rocked position until a multiplication operation is completed and the control key is released from its latch, as will hereinafter be described.

The continuous leftward shifting of the carriage thus initiated is terminated when the carriage reaches the extreme left-hand position, shown in FIG. 1, in all multiplication operations. This termination of the shifting operation is achieved in the machine of the patents abovementioned by mechanism best shown in FIGS. 4 and 11, but to some extent shown in FIG. 3 as well. This mechanism comprises an override pawl 235 (see FIG. 4), which is pivotally mounted on the right end (to the left in FIG. 4) of the shift rack 169 by any suitable pivotal mounting, such as stud 236. This pawl is provided with a notch which serves as the terminal notch in the shift rack 169 and is biased (clockwise in FIG. 4) to the position in which the notch is in alignment with the notches 168 of the rack, as by a spring 237. However, when one of the pins 167 engages the notch of the override pawl 235 and a further shift of the carriage is attempted to the left (to the right in FIG. 4, which is a rear view of the shifting mechanism), the adjacent pin engages the lower face of the pawl and rocks it against the force of spring 237. When so rocked, a nose 238 on the extreme right end of the pawl engages a shelf, or bracket, formed at the upper end of a slide 239 (see FIG. 11 also). This slide is resiliently biased to its upper position shown in both figures by any suitable spring, such as the tension spring 240, and is slidably mounted on the rear bearing plate 74 by any suitable means, such as pin-and-slot mounting 241. The lower end of the slide engages a rearwardly extending arm of a bellcrank 242 that is pivotally mounted on some suitable support, such as on the digitation control shaft 122. A lower arm of the bellcrank is pivotally connected to a forwardly extending link 243, the forward end of which link is pivotally connected to an upwardly extending leg of a bail 244. Preferably this bail is mounted on the transverse shaft 220 (as best shown in FIGS. 3 and 11) and is formed with an offset left leg 245 extended rearwardly from the shaft 220 and then to the left to a point adjacent the intermediate frame plate 44. This extended leg 245 underlies the pusher link 222 that controls the operation of the left shift clutch control rod 152 and the pusher link 227 which controls operation of the shift clutch control rod 188—both of which were set by the rocking of the shaft 220. Thus, the operation of the overide pawl 235 (FIG. 4), when the carriage reaches the extreme left-hand position shown in FIG. 1 (the extreme right-hand position shown in FIG. 4), rocks the bell crank 242 and hence bail 244. Thereupon the extension 245 of the bail lifts the two pusher links 222 and 227, so that they release the sleeve 224 and the clutch control rod 188, respectively. When the sleeve 224 and the rod 188 are thus released, the spring 154 on the left shift control rod 152 and the spring 189 on rod 188 immediately snap the control rods to their forward position, so that the return of the override pawl to its normal position, and hence the return of the bail 244 to the normal position shown, leaves the two pusher links 222 and 227 riding upon the pin 223 and rod 188, respectively, with their shoulders disengaged therefrom. Thus, they exert no further control upon these clutches, even though the shaft 200 remains in its rocked position until the end of the program of operations controlled by the multiplier keys.

G. *Multiplying Mechanism*

The machine with which the present invention is associated will necessarily have a multiplying mechanism, preferably of the type shown in the patents to Friden, Nos. 2,371,752 and 2,399,917 already mentioned. Such a mechanism includes the multiplication value keys 250 (FIG. 1) forming a small 3 x 3 keyboard in the lower left-hand corner of the machine. Immediately adjacent this small ten-key keyboard are the multiplication control keys, which, in the machine of these patents, comprise three keys: a "MULT" key 251, which is effective to first clear the product register dials 51 and then perform the multiplication operation to provide a single product; an "ACCUM MULT" key 252, which performs the multiplication operation without clearing the product register dials and hence accumulates a series of individual products; and a "NEG MULT" key 253, which performs a multiplication operation subtractively, without clearing of the product register dials, so as to subtract one product from another. Depression of the multiplier keys 250 sequentially inserts the multiplier value factor into a series of ordinally arranged multiplier seleciton segments 260 (FIG. 5) rotatably mounted in a laterally shiftable multiplier carrier 261. The selection segments 260 are individually and rotatably mounted on a transverse shaft 262, which, in turn, is rotatably journalled in the multiplier carriage frame 261. Associated with each segment 260 is a "0" latch 263 which normally holds the associated segment in its "0," or inoperative, position against the bias of a spring (not shown) that urges each segment to an extreme value position (counter-clockwise in FIG. 5. The manipulation of the multiplier valve keys 250 is effective to set a respective value pin 264 mounted in the multiplier carriage, to release the coordinal "0" latch 263, and to step the carriage an ordinal space to the left through an escapement mechanism, not clearly shown in the drawing. The mechanisms for operating the value pin 264, the "0" latch 263, and the escapement mechanism are fully shown and described in the Friden patents above-mentioned, but are not pertinent to the present invention and hence need not be described. It can be noted, however, that the multiplier carriage 261 is strongly biased toward the left of the machine through the medium of a bellcrank 265 (FIG. 5) and a strong spring 268 (FIG. 20) extending transversely of the machine. It can also be mentioned that the escapement mechanism includes a latch arm 266 (FIG. 15), which, when lifted, permits the carriage to escape to the left. This latch arm 266 will be utilized in the squaring operation to be described in the next section in order to permit the escapement of the multiplier carriage 261 two orders to the left (it will be returned one order following the override cycle to hold the highest order segment in the first escaped position). However, other than this, the mechanisms just mentioned are not important to the operation of the machanism in the present invention.

Depression of the "MULT" key 251 is effective to rock the shaft 210, which initiates machine operation and also, at an intermediate point of the first cycle of machine operation, conditions the programming mechanism which is effective to set both the left shift and the register clearing clutches in their operative position. It also conditions the machine for a positive multiplication operation as soon as the carriage 50 has reached its extreme left-hand position and the registers are cleared. Rocking of the shaft 210 is secured by a bellcrank 270 (FIG. 7), which is connected to the stem of the key 251 by a pin-and-slot connection 271. The bellcrank is mounted on the auxiliary frame plate 44, as by a stud 272, and carries a downwardly projecting leg 273. The arm carries a roller 274 which engages the forward edge of an arm 275 that is rigidly mounted on the shaft 210. Hence, the depression of the key 251 rocks the bellcrank 270 (counter-clockwise in FIG. 7), thereby rocking the arm 275 and shaft 210 (clockwise in this figure) to close the motor switch and engage the clutch, by means of the mechanism shown in FIG. 11 and previously described. Rocking of shaft 210 also rocks the arm 211 (shown in FIG. 3) to set the eccentric to rock the control shaft 220 and cause engagement of the left shift and register clearing clutches.

The depression of the key is also effective to initiate a positive, or additive, multiplication operation by means of an arm 276 underlying the stem of the key and which is engaged by the key after a short depression thereof. This arm 276 forms the right leg of a bail 278 which is rotatably mounted on a shaft 656. The other arm 292 of the bail (see FIG. 5) supports the forward end of a link 279, the rear end of which is connected to a bellcrank 280. This bellcrank is pivotally mounted on the right side of the left side control plate 45 by a suitable stud 281. The forwardly extending arm of the bellcrank is connected by means of a link 282 to a control arm 283. The control arm is rotatably mounted on a pivot stud 284, likewise mounted on the right side of the left-hand control plate 45 and, at its rear end, is connected by means of a spring 285 to a gate setting arm 286. The gate setting arm is pivotally mounted to the upper end of a cam follower 287 and its rear end is formed as a shoulder 288 adapted to engage a pin 289 on the upper end of a digitation control lever 290 that is mounted on the left end of the digitation control shaft 122. The entire linkage just described is normally biased to its inoperative position shown by means of a spring 291 tensioned between the forward arm of the bellcrank 280 and a suitable stud (not shown) on the right side of the left-hand control plate. However, depression of the "MULT" key 251 rocks the bail 278 (counter-clockwise in FIG. 5), which, through link 279, rocks the bellcrank 280 in the same direction and thereby lifts the control arm 283. Thereupon the spring 285 resiliently lifts the gate setting arm 286, so that its shoulder 288 engages the pin 289. Thereafter the rocking of the cam follower 287 sets the digitation control mechanism for additive operation, as is well-known.

Depression of the "ACCUM MULT" key 252 (see FIG. 15) also sets the machine for additive operation and rocks the shaft 210 to initiate machine operation. The stem of the key 252 has a pin-and-slot connection 295 with the front end of a longitudinally extending control lever 296. This control lever is pivotally mounted on a pivot stud 297 carried by the rear section of the left-hand control plate 45 (FIG. 15). Adjacent its rear end it carries a pin 298 (see also FIG. 5) which lies within a slot 299 formed in the rear end of the digitation control arm 283. Thus, the depression of the key 252 rocks the lever 296 (clockwise in FIGS. 5 and 15) to lift the additive digitation control arm 283 to its operative position in which its shoulder 288 (FIG. 5) engages pin 289 on the control lever 290.

The depression of the key 252 is also operative to rock the initiating shaft 210 by means of an intermediate lever 305 (FIG. 15), the rear end of which is also pivoted on the stud 297. The forward end of the intermediate lever carries a stud (not shown in these figures but shown and described in the Friden multiplier patents above-mentioned) which underlies the lever 296. Hence, the rocking of the lever 296 (clockwise in FIG. 15) is effective to carry lever 305 along with it. A downwardly projecting extension 306 of this lever engages a pin 307 carried by the outer, or free, end of a lever 308 keyed to the shaft 210. Hence, the rocking of lever 305 (clockwise in FIG. 15) is effective to rock the shaft 210 (counter-clockwise in FIGS. 15 and 11 or clockwise in FIG. 7) to initiate machine operation and the conditioning of the left shift and register clearing mechanisms.

The rocking of shaft 210 is also effective to disable the clearing clutch control mechanism, so that the operation of the eccentric hook previously mentioned will not be effective to clear the product register. This is done to enable the accumulation of a number of products, as is well-known in the art. The means for securing this purpose comprises a pin 309 on the arm 305, which is embraced within a slot formed in the upper end of a link 310. The lower end of the link is pivoted to an arm 311 that is rigidly secured to a shaft 312. The left end of the shaft 312 is journalled in the left side control plate 45 (as shown in FIG. 15), and the right end is journalled in the auxiliary frame plate 44 (as shown in FIG. 7). The right end of the shaft carries an arm 313, on the upper or free end of which is a pin 314. The pin 314 engages the upper edge of the front arm of a rocker 315, the rear end of which is bent to form an ear 316 which underlies the rear end of the pusher link 227 that controls the operation of the left shift control rod 188 (see also FIG. 3). Thus, the rocking of the shaft 312 (counter-clockwise in FIG. 15 and clockwise in FIG. 7), from the rocking of the intermediate lever 305, is effective to disengage the pusher link 227 from the clutch control rod 188 and, therefore, disables the automatic register clearing operation.

The negative multiply key 253 engages the forward end of a subtractive multiply control lever 320 (see FIG. 5) through a suitable pin-and-slot connection 321. This lever lies immediately to the right of the accumulate multiply control lever 296 and is likewise pivoted on the pivot stud 297. Its shape, rearwardly of the pin-and-slot connection 321, is identical with that of the accumulate multiply lever 296. At its rear end it carries an ear 322, which forms a seat for a tension spring 323, the other end of which is connected to a subtractive digitation control arm 324. This arm is likewise pivoted on the cam follower 287 and its rear end is formed as a shoulder 325 adapted to engage a pin 326 on the lower end of the digitation control lever 290. Hence, the depression of the "NEG MULT" key 253 rocks the lever 320 (clockwise in FIG. 5), whereupon the spring 323 lifts the control arm 324 so that its shoulder engages the pin 326. The subsequent operation of the cam follower 287 will then be effective to set the machine for subtractive operation.

The negative multiply lever 320 likewise overlies the pin (not shown) carried by the intermediate lever 305 (FIG. 15), so that the depression of the "NEG MULT" key 253 is likewise effective to rock the intermediate arm 305. This, as explained in connection with the accumulate multiply mechanism control arm 296, is effective to initiate a machine operation and to simultaneously disable the register clearing clutch.

The depression of any of the three control keys is thus effective to initiate a machine operation by closing the motor switch and engaging the main clutch, and simultaneously throws the machine into a left shift operation. It will, if the "MULT KEY" 251 is depressed, simultaneously condition the register clearing mechanism for operation. The actual multiplication operation is initiated by the operation of the override pawl 235 (FIG. 4) and its operation of the slide 239, bellcrank 242, link 243, and bail 244 (see also FIG. 3). The left-hand extension 245 of the bail 244, as shwn in FIG. 7, underlies a rocker arm 330 that is pivotally mounted on the shaft 220. A pin 331 carried by the lower end of this rocker is embraced by a slot formed in the rear end of a link 332. The forward end of the link 332 is pinned to an arm 333 that is rigidly secured to a shaft 334. The shaft is journalled in the auxiliary frame plate 44, as shown in FIG. 7, and also in the left side control plate 45, as shown in FIG. 15. The left end of the shaft 334 carries a latch member 335 rigidly keyed thereto. The latch member 335 normally engages a pin 336 carried by a multiplication control lever 337. This lever is pivoted on the left side control plate by any suitable means, such as stud 338, and has a pin-and-slot connection 339 with a second lever 340. A strong spring 341 biases both the second lever (counter-clockwise in FIG. 15) and the control lever 337 (clockwise in this figure) to their operative positions. Such rocking of the levers, however, is normally prevented by the latch 335, which, as just mentioned, is operated from the operation of the override pawl when the carriage has been shifted to the extreme left-hand position. Incidentally, these levers are latched in their inoperative positions by a second latch member 342, which, in some models of the "Friden" machine, is rocked to a releasing position directly by depression of any of the keys 251, 252 or 253, and in other models of the machine is rocked by an intermediate mechanism controlled by the rocking of shaft 220 (but not shown herein) which rocks shaft 656 and U-shaped lever 653. In either event, the operation of the lever 337 is blocked by latch 342 unless one of the multiplier control keys is latched in its depressed position, and thereafter the override pawl is operated to release latch 335.

The rocking of the lever 337 (clockwise in FIG. 15) is effective to rock a lever 345 (clockwise if viewed from the front of the machine), the upper end of which bears against a cam 346 (FIG. 5) slidably keyed to the main drive shaft 112. Normally this cam lies to the left of a roller 347 carried by the upper end of the follower arm 287, and hence has no effect upon the follower. However, when the cam 346 is shifted to the right by lever 345, it lies in the plane of the roller and is thereupon effective to rock the follower (counter-clockwise in FIG. 5). This rocking of the follower is effective to force both the additive control arm 286 and the subtractive arm 324 rearwardly. In any multiplication operation, one or the other will have been set into registry with their respective pins 289 or 326 of the lever 290, and hence will control the direction of rocking of the digitation control shaft 122. Incidentally, the follower 287 is latched in the adjusted position by a latch member 348, so that the follower 287 and its levers 286 and 324 are held in the adjusted position until released at the end of an ordinal series of operations, as will be described shortly.

Simultaneously with the shifting of the cam 346 into its operative position, a feed mechanism for the incremental return of the operative one of the multiplier value segments 260 to its "0" position is rendered operative. A control link 353 (see FIG. 15) is connected to the pin which forms the connection between the two operating levers 337 and 340. A slot in the upper end of the link embraces a pin carried by an arm 354 which is rigidly mounted on a short shaft 355 (see also FIGS. 5 and 8). The shaft 355 is journalled in the left side control plate 45 and in the auxiliary left side frame plate 46, and is biased to an inoperative position (clockwise in FIGS. 15 and 5 and counter-clockwise in FIG. 8) by a spring 356 (FIG. 15). At its right end the shaft 355 carries a holding pawl 357 (FIG. 8), which also doubles as a restraining member for the segment feed pawl 358. The feed pawl 358 is operated by an eccentric cam 359 which is mounted on the main drive shaft 112. This cam is engaged by a closed cam follower 360, which thus reciprocates in each machine cycle of operation. The lower end of the cam follower, as shown in FIG. 8, is connected to an arm 361 pivotally supported on the machine frame by means not shown herein but fully shown in the patents above-mentioned, which arm, at its outer end, carries the feed pawl 358. Thus, the feed pawl 358 reciprocates in each machine cycle of operation, regardless of the nature of that operation. However, the feed pawl is disabled by the holding pawl 357, in the clockwise position of the holding pawl shown in FIG. 8, at all times except when the link 353 (FIG. 15) is elevated by operation of operating levers 337 and 340 in multiplication operation.

The release of the two arms 337 and 340 (FIG. 15) thus enables the shaft 355 to rock (clockwise in this figure or counter-clockwise in FIG. 8) to enable the feed pawl 358 to engage the rack teeth formed on the rear edge of each multiplier segment. By this means the multiplier segment in the operative position, in each ordinal series of operation, is returned incrementally from its value adjusted position to the "0" position shown, in sequential cycles of operation.

When the segment in the operative position is returned to the "0" position (shown in FIG. 5), its upper edge engages an ear formed on the forward end of a shift control lever 366 that is pivotally mounted on a stub shaft 367. The shift control lever 366 is resiliently biased to a position clockwise of that shown in FIG. 5 by conventional means during the continuous cycles of digitation, and is rocked to the position shown when the multiplier segment 260 in the operative ordinal position returns from its "1" to its "0" value position. Such rocking of the lever 366 causes a roller 368 on the rear end thereof to engage the upper edges of the additive and subtractive control levers 286 and 324, thereby forcing their respective shoulders away from the associated pins 289 or 326. This enables a conventional centralizing mechanism associated with the digitation control shaft 122 to return the shaft, and consequently the control bail 121 (FIG. 2), to the neutral, or inoperative, position shown in FIG. 2.

A link 369 is also mounted on the rear end of the lever 366. The lower end of the link supports the rear end of a hooked link 370 which is pivoted to an arm 371 that is rotatably mounted on a transverse control shaft 372. The rear end of the hook member 370 is formed as a hook adapted to engage an ear 378 on a latch member 373 when the hook is lowered by the rocking of the shift lever 366 to the position shown in FIG. 5. At other times during a multiplication operation the lever 366 is rocked, clockwise from the position shown, by a linkage controlled by the operating lever 340 (FIG. 15), not shown herein but described in the multiplier patents above-mentioned. Shortly before the end of each cycle of operation, the arm 371 is rocked by a pin 374 carried by the cam 346, which rotates in a counterclockwise direction (FIG. 5). This pulls the link 370 forwardly, or to the right, so that when the link is lowered to engage ear 378, the reciprocating link will rock the latch member 373 (in a counter-clockwise direction in FIG. 5), so that a shoulder formed thereon releases a program lever 375. The program lever 375 is rigidly secured to the shaft 372, as is a second arm 376 lying adjacent the rotatably mounted arm 371. Both arms 371 and 376 are resiliently biased rearwardly (in a counter-clockwise direction in FIG. 5) by suitable springs 377, only one of which can be seen in this figure as the other lies immediately behind it. Thus, the release of the arm 375 by its latch 373 enables the rocking (counter-clockwise in this figure) of the control assembly comprising this arm, the shaft 372 and the arm 376. The rocking of this shaft is effective to: (a) release cam follower 287, so that the digitation control mechanism can be set for operation in the next ordinal position; (b) disable the feed pawl for the multiplier segment; (c) to initiate a single left shift of the carriage 50; and (d) normally initiate a single ordinal shift of the multiplier carriage 261 for single ordinal step to bring the adjacent higher order multiplier segment into an operative position.

(a) An offset portion of lever 375 which is used as a shoulder for engagement by latch 373 is also adapted to engage a forwardly projecting nose of latch 348. Hence the rocking of arm 375 is effective to push the latch 348 away from engagement with the stud on follower 287. Thereupon, the follower will rock to follow cam 346, to be reset at the end of the shifting cycle, by which time the multiplier carriage 261 has been shifted and the control lever 366 will be rocked back to its digitation position to allow either control link 286 or 324 to again become operative.

(b) The disabling of the feed pawl for the operative multiplier segment is accomplished by the linkage shown in FIG. 5, which includes a link 380, one end of which is supported on the arm 376 by a pin-and-slot connection 381, and the other end of which is supported on a pin carried by an arm 382 that is mounted on the shaft 355. It will be recalled that the rocking of this shaft (counter-clockwise in FIG. 5 or clockwise in FIG. 8) disables the segment feed pawl 358.

Incidentally it can be mentioned that it is desirable, at least in the machine with which this invention is preferably associated, to provide a delay latch controlling operation of the shaft 355 (FIG. 5) and consequently the holding pawl 357 and the feed pawl 358. This delay latch is shown particularly in FIG. 6 and is adapted to latch the arm 382 (see also FIG. 5) in the disabling position (the counter-clockwise position shown in this figure). The latch preferably comprises a three-armed member 423 which is pivotally mounted on the intermediate frame plate 46 by any suitable means, such as a stud 424. One arm of the lever carries a shoulder 425 which engages a square stud 426 on the arm 382. A second arm of the lever is formed with a spring seat to which is connected a spring 427 tensioned between the latch and a stud on the frame plate. The third arm carries a stud 428 which is adapted to be engaged by the reciprocating link 360 (see also FIG. 8) which operates the feed pawl 358 in the latter portion of its cycle. Thus the control pawl 357 is latched in its inoperative position by the latch 423 as soon as the arm 376 (FIG. 5) is released to the force of its spring 377. The latch remains effective until the next, or shifting, cycle at a point in that cycle at which the feed pawl 358 completes its feed stroke. Thus the holding pawl 357 cannot be released until after the feed pawl will have completed its operation, and consequently there can be no operation of the aligned segment 260 in that cycle.

(c) The rocking of the shaft 372 is also effective to initiate a right shift of the carriage 50 by operating the right shift clutch 151 (FIG. 3). It is seen in this figure that the shaft 372 extends to, and is journalled in, the right side frame plate 42. Adjacent the plane of the right shift control rod 153, the shaft carries an arm 385 that is slidably but nonrotatably mounted thereon. The conventional mounting of this arm is shown in the figure and comprises a hub that is loosely journalled on the shaft. The arm is held against rotation by means of a second arm 386 that is pinned to the shaft, the two arms being rotatably tied together by means of a pin 387 mounted on the second arm penetrating a slot (not shown) formed in the arm 385. The first-mentioned shift control arm 385 is biased toward the left of the machine by a spring 388, but is normally held in the rightward operative position shown by means of a bail 389, the left end of which engages the right side of the multiplier carriage 261 when that carriage is in its home position. Thus, when the carriage is escaped to the left by the entry of a value thereinto, the first arm 385 shifts to the left from the inoperative position shown in FIG. 3. When so shifted to the left, the arm 385 can engage a pin 390 carried by an arm 391, the pin bearing against the forward end of the right shift rod 153. Thus, the rocking of shaft 372, when the multiplier carriage has been permitted to escape one order to the left, is effective to operate the right shifting mechanism to shift the carriage 50 one order to the right.

(d) It has already been mentioned that the rocking of the shaft 372 is normally effective to shift the multiplier carriage 261 (FIGS. 5 and 9) one order to the right. The mechanism for this purpose is shown in FIGS. 3, 7 and 9. It is seen in FIGS. 3 and 9 that the shaft 217, which is constantly geared to the main drive shaft 112 through miter gearing 113, 218, carries an eccentric drum cam 392 at its lower end. The eccentric portion of this cam mounts a feed pawl 393 pivotally mounted on a stud carried by a bracket on the frame plate. Normally the feed pawl 393 lies in a plane below a rack 394 affixed to the multiplier pin carriage 261, but is lifted into the plane of the rack by an arm 395. In the machines described in the multiplier patents abovementioned the arm 395 is pinned to, or otherwise rigidly mounted on, the shaft 372, so that the rocking of the shaft is directly effective to lift the drum cam 392 and hence the feed pawl 393 into shift-engaging position. In the present invention the arm 395 is rotatably journalled on the shaft, so that in squaring operations the rocking of the shaft 372 will not effect a multiplier carriage shift, although it will be effective to disable the segment feed pawl and to initiate a shift of the accumulator carriage 50. This involves a resilient connection between the shaft 372 and the rotatably mounted arm 395, which mechanism is shown in FIGS. 7 and 19. Preferably this yieldable connection comprises an arm 396 that is pinned to, or otherwise rigidly mounted on, the shaft 372. Immediately adjacent this arm 396 is a bail 397, the right leg 398 of which carries a pin 399 that engages the lower edge of the fixed arm 396. The bail is resiliently rocked to a shift-operating position (clockwise in both figures) by a spring 400. The left leg 401 of the bail is directed upwardly and forwardly, and its upper edge engages a pin 402 (see also FIG. 9) riveted on, or otherwise affixed to, the rotatably mounted arm 395. A second spring 403, tensioned between the pin 402 and a seat on the bail 397, holds the arm 395 against the leg 401 so that it cannot be jarred into an operative position at an inopportune time. Normally the rocking of the shaft 372 to its inoperative position (counter-clockwise to the position shown in FIGS. 7 and 9) causes the fixed arm 396 to engage pin 399 and thereby rock the bail 397 to the inoperative position shown in FIG. 7. In this situation the spring 403 pulls the loosely mounted arm 395 to its inoperative position. When, however, the shaft 372 is rocked by the operation of the multiplier mechanism above described, the arm 396 rocks with it (clockwise in FIGS. 7 and 19). Thereupon the spring 400 becomes effective to rock the bail 397 (likewise in a clockwise direction), whereupon the leg 401, through its engagement with pin 402, lifts the rotatably mounted arm 395 to its shift-controlling position and the multiplier carriage is thereby shifted one ordinal position. It can be mentioned here that means is provided for engaging the pin 399 carried by the right leg of the bail 397, so that the bail cannot rock to follow movement of arm 396. This blocking means will be described in connection with the squaring mechanism of the succeeding sections, but it can be mentioned here that in a squaring operation the multiplier carriage will not be shifted, and for this reason the connection between the shaft 372 and the shift control arm 395 is made resilient, as herein described.

It should be mentioned that in multiplication operations a multiplier segment, after being returned to its "0" position and thereby rocking the shift control arm 366, is shifted to the right, away from the feed pawl 358. The segments can be latched in their "0" position at that time, but in our prefererd form the latch 263 (FIG. 5) is disabled and the segment is thereby enabled to return to the adjusted position determined by the setting of the value pin of the pin box. Then, after the carriage has been returned to its home position, all of the so adjusted multiplier segmnets are returned to their "0" positions by the restore mechanism shown in FIG. 9. This mechanism includes a restore cam 409 pinned to, or otherwise rigidly mounted on, the shaft 214. When the multiplier carriage is shifted one order to the right of its home position, this cam engages a roller 410 on a gear segment 411. The gear segment is rotatably mounted on the multiplier carriage frame 261 by any suitable means, such as stud 412. It is thus obvious that the rotation of the cam 409 and its engagement with the roller 410 will rock the gear segment 411 (counter-clockwise in this figure). The gear segment meshes with an idler gear 413, also mounted on the multiplier carriage frame by any suitable means, such as pivot stud 414. The idler, in turn, meshes with a gear segment 415 rigidly mounted on the right end of shaft 262 (see also FIG. 5). This gear segment and a rack segment 624 on the left end of the shaft 262 carry a restore bar 416. The restore gear segment, or arm, 415 is resiliently biased to its inoperative position by any suitable means, such as the spring 417 tensioned between seats formed on the arm 415 and the multiplier carriage 261. The rocking of the first gear segment 411, from the operation of cam 409, results in rocking the gear segment 415 and its restore bar 416 (counter-clockwise in FIG. 9 or clockwise in FIG. 5). When so rocked, the bar 416 engages one of the spokes of each of the selection segments 260, thus returning all of them to their "0" positions, in which positions they are latched by their "0" latches 263 (see FIG. 5).

II. SQUARING MECHANISM

The present invention is directed to squaring a value entered in the main keyboard keys 80, or otherwise set in the selection mechanism, e.g., by a back-transfer operation; that is, multiplying such a value by itself. In the present invention a value set in the main keyboard is operative as a multiplicand factor, as it was in the multiplier patents above-mentioned, for that value remains registered in the keyboard and controls the entry of values into the register with each cycle of operation. In addition, mechanism is provided in the instant invention to automatically sense an ordinal value in this keyboard, beginning with the first, or lowest, order and progressing ordinally across the keyboard, and to set the value so sensed in the highest order multiplier selection segment 260 and initiate a multiplication operation. Obviously a multiplication operation with a value set in the highest order multiplier segment will proceed through a single ordinal series of operations controlled by that segment to enter the multiplicand value into the product register the required number of times. In the present invention the return of the operative, or highest order, multiplier segment to its "0" position initiates the interordinal program involving termination of digitation by disabling the operation of the multiplier feed pawl and the return of the digitation control gate to its neutral, or inoperative, position and then initiating a single right shift operation of the register carriage 50. It has already been noted, but it can be repeated again, that in our invention the normal third operation involved in this interordinal program, namely, the shifting of the multiplier carriage a single order to the right, is blocked as it is preferred that the multiplier carriage remains in its adjusted position in which the highest order segment lies in the operative position until the squaring operation is completed. This last step involves merely blocking the multiplier carriage shifting mechanism by blocking operation of the bail 397 (FIGS. 7 and 19) by the means already indicated.

Our invention involves two forms, or embodiments, which are essentially the same as far as operation is concerned, but differ in the controls. In one form a manually set key is utilized to condition the machine for conventional multiplication or for squaring. In the second form the selection is made automatically by sensing whether or not a value stands in the multiplier unit: if there is a value in the multiplier unit, then it controls, and conventional multiplication is automatically determined; if there is no value standing in the multiplier unit, then the sensing mechanism enables operation of the squaring mechanism. This sensing element is quite simple, as it is only necessary to determine whether the multiplier carriage 261 is in its home position or not. If it is in its home position, the mechanism, which is normally biased for squaring, is enabled to operate. If the carriage is out of its home position, that displacement blocks the squaring mechanism and locks it in its disabled position, and conventional multiplication proceeds. These two embodiments will be described hereafter. It probably will be easier to understand if the manually operated control key is first described and the automatic version then explained.

A. *Manually Controlled Squaring Mechanism*

In the present invention we provide a sensing mechanism for each order of the main keyboard. This mechanism is operated only in a squaring operation and is effective to provide a cycle of operation following the operation of the override pawl and before the actual beginning of the multiplication operation, during which cycle the lowest order of the keyboard is sensed and the value set in the highest order multiplier segment. Thereafter the sensing operation takes place during the carriage shifting cycle, so that no further or additional cycles are required in the interordinal program of multiplication. Thus, the successive ordinal values, beginning with the lowest and proceeding toward the highest, are sensed during the carriage shifting cycles; and these values are set in the highest order multiplier segment, so that as soon as the shifting operation is terminated, the multiplier mechanism again becomes operative to "count" the cycles of operation as determined by the setting of this multiplier segment. Upon return of the segment to "0," the interordinal program is again repeated with the shifting of the carriage and additional step to the right, and multiplication thereafter continues under the next higher order of the keyboard. Primarily our invention relates to the mechanism for sensing an ordinal value standing in the main keyboard keys 80 and setting the highest order multiplier segment successively at the end of each ordinal series of operation to the value so sensed. The essential mechanisms to this invention are:

(1) The control mechanism (that is, the squaring control key);

(2) Ordinal value sensing mechanism (that is, the mechanism for sensing the values in each of the orders of the main keyboard);

(3) Mechanism for the ordinal control of the sensing mechanism which is effective to select one, and only one, sensing mechanism to be operative (to sequentially program the operation of the sensing means to sense values from the lowest to the highest order);

(4) Mechanism for setting the sensed value into the multiplier selection segment;

(5) Mechanism for controlling multiplier carriage escapement (to permit the escapement of the carriage, permit its return to the first escape position during the otherwise idle cycle following operation of the override pawl, and thereafter to prevent its shifting to its normal home position until the operation is completed);

(6) Mechanism for restoring the machine to its normal condition.

1. SQUARING CONTROL KEY

In the embodiment to be first described, a control key 450 (FIG. 1) is mounted adjacent the multiplier unit. This key has a rearward position in which it is preferably aligned with the customary "REP" (repeat multiplication), "NON ENT" (counter disabling), and "CTR CON" (counter sign control) keys which are located above the multiplier keyboard. It can be moved from this rearward position forwardly to that shown in FIG. 1 in which it is effective to disable the conventional multiplying mechanism and to enable the squaring mechanism of our invention. This key, as is best shown in FIGS. 15 and 18, is mounted on an upstanding projection 451 that is formed on a control slide 452. The slide is mounted for longitudinal movement by means of a guide aperture (not shown) in a bracket 453 mounted on the left side control plate 45 and by means of a pin-and-slot connection consisting of a slot 454 in the rear end of the slide embracing a pin, or screw stud, 455 threaded into the left-hand control plate 45. The forward portion of the slide is provided with a pair of notches 456 adapted to cooperate with a spring detent 457 to hold the key 450 in either of its adjusted positions.

The control slide 452 also carries a roller 465 (FIG. 15) which cooperates with an arcuate cam surface 466 on an extension 467 (see FIGS. 17 and 18) of a bail 468. Preferably the extension 467 is secured to the bail 468 by being riveted thereon, although obviously both could be formed as an integral unit. The extension 467 and bail 468 are resiliently biased to an operative, or squaring, position by any suitable means, such as spring 469 (FIG. 15) tensioned between a stud on the lower projection of the extension 467 and a seat formed on a restore link 645. When the key 450 is in the forward position shown in FIG. 15, the extension and bail 467, 468 are enabled to rock (counter-clockwise in FIG. 15). On the other hand, when the control key 450 is in its rearward, or normal multiplication, position, the roller 465 engages the nose 470 of the extension 467, in which event the extension and bail 467, 468 are rocked in the other direction (clockwise in this figure). The bail 468 (as best shown in FIGS. 5 and 18) is rotatably mounted on a transverse shaft 475 that is journalled in the side frames (not shown) of the multiplier keyboard assembly. The right arm of this bail carries a laterally extending ear 471 that is effective to control the positioning of a latch rack 624, the purpose of which can best be described hereafter.

Preferably the control slide 452 is Y-shaped, as best shown in FIG. 18. A pin 458 carried by the lower arm 459 of the slide 452 is embraced by a notch 460 that is angularly formed in the forward end of an arm 461. The arm 461 is pinned to, or otherwise rigidly mounted on, the transverse shaft 475. The shaft 475 carries an escapement bail 476 that is pinned to, or otherwise rigidly mounted thereon, the right-hand end of which bail is cut away, or formed, to provide an abutment shoulder 477 adapted to engage the left-hand end plate of the multiplier pin carriage 261 whenever the control key 450 is in its forward position and the bail 476 is rocked to the counterclockwise position shown in FIGS. 5 and 15. However, when the key 450 is in its normal, or conventional multiplying, position, and the slide 452 consequently is in its rearward position, the bail 476 is rocked clockwise from the position shown in these figures. In that position of the bail, the left end plate of the multiplier carriage 261 misses the bail 476 entirely and the multiplier carriage can be escaped to its extreme position. It can be noted here that the spacing of the shoulder 477 from the left-hand end plate of the multiplier carriage 261 is such as to enable the carriage to be escaped between one and two ordinal steps from its home position (see FIG. 17).

The right end of the control shaft 475 also carries a locking arm 478 (FIG. 18) that is designed to prevent rocking of the shaft 475 or adjustment of the key 450 at all times unless the multiplier carriage 261 is in its home position. As shown, this arm carries a forwardly extending ear 479 adapted to cooperate with a bracket 480 (FIG. 5) forming a portion of the multiplier carriage 261. As shown in FIG. 5, the ear 479 will abut bracket 480 if the arm 478 is rocked with the carriage out of its home position. When the carriage is in its extreme right-hand, or home, position, the bracket 480 lies immediately to the right of the plane of the ear 479, so that in that position, and in that position only, the shaft 475 can be rocked and the key 450 adjusted from either the normal multiplication or the squaring position as desired. This interlock prevents changing the setting of key 450 after the first multiplier value has been inserted in the multiplier segments 260 and the carriage 261 shifted one order to the left as a result.

The arm 478 also carries a locking link 481 (FIGS. 5 and 18) that extends through an aperture in the multiplier keyboard frame. In the squaring position shown in FIG. 5, an enlarged nose 482 on the forward end of link 481 lies in the path of travel of an arm 483 that is rocked with each depression of a multiplier value key 259, so that when the machine is conditioned for a squaring operation it is impossible to set values into the multiplier pin carriage by operation of the keys. When the shaft 475 and key 450 are in their normal multiply position, a notch 484 behind the nose 482 permits the ear (not shown) on the operating arm 483 to rock therethrough so that the arm 483 can be rocked and the multiplier value keys can be depressed.

The rear end of the setting conditioning slide 452 carries a pin 490 (see FIGS. 15 and 18) that is embraced within a slot 491 formed in the upper end of a rocker 492. This rocker is pivotally mounted on any suitable stud 493 riveted on, or otherwise rigidly secured to, the left-hand control plate 45. The lower end of the rocker is formed with a second slot 494 which embraces a pin 495 carried on the left end of an adjusting lever 496. This lever is pivotally mounted on the base plate of the machine by any suitable stud (not shown), and its right end is embraced within a notch 497 (see FIGS. 10 and 18) formed in the lower end of a control member 498. The control member is rotatably mounted on a stub shaft 499 extending to the right from the auxiliary frame plate 44. The control member 498 is thus rocked about its shaft 499, in one direction or the other, as the squaring control key 450 is set to its operative or its inoperative position. The control member performs several functions in conditioning operating mechanisms to be hereinafter described, and these functions and the mechanisms operated by the control member 498 can best be described under the several headings following. For the moment it can be noted that this control member is provided with a rearwardly extending hook 500 adaped, when the key 450 is in its operative, or squaring position and the control member 498 is rocked (clockwise from the position shown in FIG. 10 to the position shown in FIG. 18) to latch behind a pin 501 formed on the lower end of a bellcrank 502 operated by the multiply clear key 503 (FIG. 1). Thus, the positioning of the squaring mechanism in its operative position effectively blocks operation of the multiplier correction key.

2. ORDINAL VALUE SENSING MECHANISM

In our invention, in order to square a number (multiply it by itself), it is necessary to set the number to be squared in the main keyboard keys 80. Then, in the squaring operation, the values standing in the various orders of the keyboard keys 80 are successively sensed from the lowest to the highest order in a continuous series of ordinal operations. In the first series of ordinal operations, the value standing in the units, or lowest, order is sensed; that value is set into the highest order of the multiplier unit; and multiplication is initiated. When that ordinal series is completed and the highest order segment 260 returns to its "0" position, the second, or tens order, value is sensed; that order set into the multiplier mechanism; and multiplication initiated. This series of operations continues until all of the orders of the keyboard keys 80 have been sensed and the squaring has been completed. The means for so sensing the various ordinal values will now be described. The sensing mechanism comprises three general mechanisms: (a) ordinal value representing members, which are set by the keyboard keys and remain set throughout the operation; (b) a sensing member for each order operative to sense the value standing in the value representing member and so controlled, preferably by a series of ordinal cams, that only one of the ordinal value sensing members can be operated at any one time; and (c) a sensing bail for operating the various ordinal sensing members. Obviously, the machine also includes a means operated by the sensing bail which serves to set the value so sensed into the highet order of the multiplier mechanism, but such setting means can best be described in Section 4 hereafter. The sensing mechanisms will now be described in the above-mentioned order.

a. *Ordinal value representing members.*—It is seen by reference to FIGS. 7, 13 and 14 that the selection bars 101 and 102 carry identical downwardly projecting brackets 505. These brackets can be formed integrally with the selection bars if desired, but preferably are separate pieces mounted thereon by any suitable means, such as rivets 506. At their lower ends, the brackets 505 are shaped to form open-ended slots 507. Each slot embraces a pin 508 carried at the rear end of a sensing member 509. These sensing members 509 are formed as rockers pivotally mounted on a common shaft 510, which shaft is journalled in bearings carried by a bracket 511 (FIG. 3) secured to the base plate 41 adjacent the right-hand frame plate 42 and the intermediate frame plate 44. The sensing members 509, associated with the "1" to "5" selection bars 101 (FIG. 7), carry at their forward end (to the left in this figure) a five-step sensing cam 512. The sensing arms 509 associated with the "6" to "9" selection bars 102 carry a four-step sensing cam 513 (FIG. 13). It can be noted that in the preferred form, the "1" to "5" sensing cam 512 has the lowermost step representative of a value of "1" and its fifth step as representative of a value of "5", while the "6" to "9" sensing cam 513, the lowest step is representative of a value of "6" and the highest is representative of a value of "9". In both FIGS. 7 and 13 the selection bars 101 and 102 are shown in their normal "0" position to which they are conventionally urged by their respective springs 107. In this situation none of the differential abutment shoulders will be engaged by their associated sensing member. However, as shown in FIG. 14, as either of the selection bars 101 or 102 is differentially moved forward by the depression of a value key, the sensing member 509 is rocked differentially (counter-clockwise in these figures) around its pivot shaft 510, thus presenting one of the differential cam faces to the sensing members, which is described in the next section.

b. *Ordinal sensing members.*—Associated with each of the ordinal pairs of sensing members 509 is an ordinal sensing slide 520 (see FIGS. 3, 13 and 14). These slides are provided with a pair of longitudinally extending slots 521, one of which encompasses the shaft 510 and the other of which encompasses a floating operating bail 530. Each of these slides at its forward end is provided with a pair of offset shoulders 522 and 523 (see FIG. 3). The shoulder 522 is adapted to engage the shoulders on the "1" to "5" cam face 512 (set by selection bar 101), while the shoulder 523 on the sensing slide is adapted to engage the shoulders of the cam face 513 set by the "6" to "9" selection bar 102. This construction is such that the sensing slide 520 can move rearwardly to the full extent of its throw when no value is set in the associated ordinal selection bars 101 or 102; can move to a position one increment less than its full throw when the value of "1" stands in the associated order, for in this event the selection bar 101 rocks the associated sensing member 509 so that the lowermost step on its cam face 512 will be engaged by the shoulder 522; and the slide 520 can move one increment only when sensing a value of "9," for in that event the shoulder 523 will engage the highest shoulder on the cam face 513 after one step of movement. In other words, the radii of the various cam steps on cams 512 and 513 are inversely proportional to the values they represent, and consequently the sensing slide 520 moves rearwardly (or to the right in these figures) in increments inversely proportional to the values. By this means the sensing slide 520 can move rearwardly in a differential amount inversely proportional to the value to be sensed, i.e., it moves ten increments when sensing a value of "0," nine increments when sensing a value of "1," etc., to one step when sensing a value of "9." It can be noted that in FIG. 14 the sensing mechanism is shown as sensing a value of "7," in which event the sensing shoulder 523 will engage the second step of the cam face 513 when the sensing slide 520 is moved rearwardly. Hence, when sensing a value of "7," the sensing slide 520 will move two steps, or increments, to the right.

All of the sensing slides 520 are individually biased to their forward, inoperative position by any resilient means, such as the tension spring 524 (FIGS. 13 and 14), which springs are preferably seated at one end on the forward flange of a bracket 526 and at its rearward end on a seat formed in a nose 525 projecting downwardly from the respective slide 520. However, the slides can be individually moved rearwardly against the tension of their springs 524 by means of a rod, or bail, 530 (see FIGS. 7 and 11 to 14). The means for operating the bail will be described in the next section, but for the moment it can be noted with particular reference to FIGS. 13 and 14 that this bail is one of the supporting members for the respective slides 520.

Each of the sensing slides 520 carries a hook member 531, which is pivotally mounted thereon by any suitable stud, or rivet, 532. At its rear end, each of these hook members 531 is provided with a shoulder 533 which is adapted to be engaged by the operation of the bail 530 after a little lost motion. The necessity for this lost motion connection will be understood by reference to Section 3 hereafter relating to the operation of the cam shaft 510, which determines which sensing slide 520 will be permitted to operate. The hook levers 531 are individually biased to an engaging position by means of a tension spring 534 tensioned between an ear on the lever and a stud on the slide. Forwardly of the pivot, or fulcrum, of the lever 531 is a cam follower nose 535 (see FIG. 14) adapted to engage the periphery of an ordinarily related cam 536. These cams have a single notch, or depression, 537. Whenever the ordinally related cam 536 is rotated to the angular position in which the notch 537 engages the nose 535 of the associated lever 531, as shown in FIG. 14, then the spring 534 is enabled to rock the lever 531 so that its hook shoulder 533 will be engaged by the operating bail 530, after some lost motion, as the bail is reciprocated, as will hereafter be described in Subsection c. It should be noted here that the respective cams 536 are angularly offset, or spirally mounted, on the shaft 510, as is shown in FIG. 16. In this figure the cams are shown from right to left representative of their angular position in the orders from "1" to "10," as indicated by the phantom numerals above each of these cams. It will be noted in this figure that there are two additional cams in this array, one between the fourth and fifth orders and the other to the left of the tenth order, the purpose of which will be described hereafter: The first in connection with the operation of the bail 530 in Subsection c hereinafter, and the second in Section 7, "Restore Mechanism." From this array, as shown in FIG. 16, it is obvious that one, and only one, of the hook levers 531 will be rocked to operative position at any one time.

c. *Sensing bail.*—The sensing bail 530 is operated by means of the mechanism shown in FIG. 11. It will be seen by reference to this figure that the ends of the bail 530 are slidably mounted in horizontal slots 514 formed in the ends of the brackets 511. It will be understood that the bail is supported at each end so that perfect linear motion is secured from the operation of the bail. The bail is operated by the rocking of a sensing shaft 543. As shown in FIGS. 9 and 18, the sensing shaft 543 is constantly under considerable rotational bias from a strong spring 544 tensioned between the lower end of a setting rocker 545 that is pinned to, or otherwise rigidly mounted on, the shaft 543—the other end of the spring being seated on a stud carried by an adjacent frame plate (not shown). The shaft carries a pair of arms 546, the right-hand one of which is shown in FIG. 11—which arms are pinned to, or otherwise rigidly mounted on, the shaft 543. Each of these arms 546 is pivotally connected to a link 547 by any suitable pivotal connection, such as pin 548. The links 547 hold the bail 530, so that rocking of the sensing shaft 543 (clockwise in FIG. 11 or counter-clockwise in FIGS. 9 and 18) from the force of its spring 544 is effective to pull the bail 530 rearwardly. It should be noted that at the end of the cycle in which this sensing operation occurs the shaft 543 is rocked in a return direction to latch it in the position shown in FIG. 11 by positive means to be described later in this section. It should also be noted here that the return of the bail 530 to the forward position shown in FIGS. 11, 13 and 14 enables the springs 524 connected to each sensing slide 520 to return an operated slide to its forward, inoperative position.

The sensing shaft 543 is latched against operation by two control latches and one program latch. The first two are effective to latch the shaft against operation at all times except when the machine has been conditioned for squaring operation and the multiplication operation initiated by the operation of the override pawl and the override bail. The program latch is operated by the multiplication programming mechanism, which is operated by the shift control arm 366 (FIG. 5) upon its rocking by the return of the operative multiplier segment 260 to its "0" position.

The first of the operation latches is controlled by the operation of the squaring key 450 and is shown particularly in FIGS. 7, 10 and 18. It will be recalled that the movement of the control key 450 to its forward, or squaring, position rocks the connecting lever 492 (counter-clockwise in FIG. 18), which, in turn, rocks the control lever 496 (clockwise in this figure), and that, in turn, rocks the control member 498 (clockwise in FIGS. 10 and 18). The control member, as best shown in FIG. 10, supports the front end of a latch link 553 to which it is pivotally connected by any suitable means, such as rivet 554. The rear end of the link is pivotally connected to a latching arm 555 by any suitable means, such as rivet 556. The latching arm 555 is pivotally mounted on a stud 557 supported by the intermediate frame plate 44 (see FIG. 7). The upper end of the arm 555 is formed as a shoulder 558 adapted to engage a pin 559 carried on the free end of an arm 560 that is pinned to, or otherwise rigidly mounted on, the shaft 543. Normally the latching arm 555 is in the position shown in FIG. 10, in which its shoulder 558 underlies the pin 559 and thereby blocks rotation of the arm 560 and consequently of shaft 543. However, when the control member 498 is rocked to its squaring position (clockwise from the position shown in FIG. 10 to that shown in FIG. 18), the latching arm is pulled forwardly to release pin 559.

The second control latch is best shown in FIG. 13 and comprises a latching lever 565 which is provided with a shoulder 566. This shoulder is adapted to engage a pin 567 mounted on the free end of a second arm 568 that is pinned to, or otherwise rigidly secured on, the sensing shaft 543. The latch arm 565 is pivotally mounted on a stud 569 extending to the right from a bracket 570 (see also FIG. 3) mounted on the front bearing plate 71. The latch member 565 is biased to a latching position (counter-clockwise in FIG. 13) by any suitable spring, such as the tension spring 571 tensioned between a stud on the bracket 570 and a spring seat in a forwardly extending tail of the latch lever 565. This latch is rocked to a disengaging position by the rocking of the override bail 244. This bail (conventionally in the machine with which our invention is preferably associated) carries an arm 246 extending rearwardly therefrom and bending around the shaft 220, already mentioned, to disable the manually controlled left shift clutch mechanism, not pertinent in the present invention. This arm 246, in our invention, carries a pin 572 which underlies the forwardly extending tail of the latch lever 565, so that the rocking of the override bail 244 (counter-clockwise in FIG. 13) is effective to rock the latch lever 565 and thereby release the arm 568 and consequently shaft 543.

It will be recalled that at the time this happens in squaring operations, the first-mentioned latch arm 555 has already been rocked to its disabling position. It can be mentioned here that substantially simultaneously with the operation of the override bail 244, the program latch for the squaring mechanism is also reelased, as will be described in the second succeeding paragraph, so that the sensing shaft 543 is enabled to rock at this point. It will be understood, of course, that the override bail 244 returns to its normal position later in the cycle, but the momentary release of the pin 567 by the shoulder 566 of the latch 565 has enabled the sensing shaft 543 to rock and immediately the latch 565 is disabled by means which will now be described.

The latch 565 is held disabled throughout a squaring operation, after first being released by the override bail and arm 245. This mechanism is also shown in FIG. 13 and comprises a two-armed rocker, or disabling lever, 573, which is pivoted on the shaft 210. This lever has a downwardly extending tail 578 at its rear end which is adapted to engage a pin 574 on the latch lever 565. The forwardly extending arm of the lever 573 forms a cam follower nose 575 engaging the periphery of a cam 577 mounted on the cam shaft 510 (see also FIG. 16). This cam has a single notch 576 which registers with the nose 575, as shown in FIG. 13, whenever the shaft 510 is in its "home," or "0," angular, position. The first incremental rotation of the cam shaft 510, which occurs in the next machine cycle, as will be explained in the next section, is effective to rock the cam 577, and thereby rock the disabling lever 573 (clockwise in FIG. 13). Thereupon the tail 578, from its engagement with the pin 574, holds the latch lever 565 disabled against the tension of its spring 571. This disabling continues until the cam shaft 510 returns to its normal, or home, position at the end of the squaring operation.

The program latch for the sensing shaft 543 is best shown in FIG. 5. It is formed preferably as a bell-crank 585 rotatably mounted on a shaft 586 extending between the left side control plate 45 and the intermediate supporting plate 46. A tail 587 of this latch lever lies in front of the ear 378 formed on latch lever 373, which ear is engaged by the hook link 370, as previously described. Thus, the operation of the hook link 370 to release latch 373 is also effective to rock the program control latch 585 (counter-clockwise in FIG. 5). The other arm of the bellcrank latch 585 is provided with a nose 588 adapted to engage an ear 589 formed on the upper end of a cam follower rocker 590. This rocker is also rigidly mounted on the sensing shaft 543, so that the release of this lever by the latch 585, substantially simultaneously with the release from latch 565 (FIG. 13), enables the sensing shaft to rock under the pressure of spring 544 shown in FIGS. 9 and 18, and also, if desired, an additional spring 591 tensioned between the lower end of the lever 590 and a suitable stud on the frame plate.

It can be mentioned here that the follower lever 590 is provided with a roller 592 adapted to engage the periphery of a restore cam 593 that is rigidly mounted on the drive shaft 112. The rotation of the drive shaft, and consequently of cam 593, is, therefore, effective to restore the lever 590 to its latched position and consequently to restore the sensing shaft 543 to its disabled position during the latter part of that machine cycle.

Incidentally, it should be noted at this point that latch 565 (FIG. 13) is released simultaneously with the release of multiplication setting arm 337 (FIG. 15), so that the multiplication shift control lever 366 (FIG. 5) is rendered effective at the same instant that shaft 543 is released. At this moment the machine is conditioned to sense the value in the first, or lowest, order and consequently the shaft 543 rocks to sense the value in the lowest order (the multiplier carriage 261 having previously been shifted to the left and "0" latch 263 having been operated by release of rocker 590). Therefore, the sensing shaft 543 will rock through an angular increment determined by the movement of the ordinally effective sensing slide 520 (at this point, the slide associated with the first order). Such movement of the slide results from the engagement of its ears 522 or 523 with the respective sensing cams 512, 513. Thereafter the sensing mechanism is then returned to neutral at the latter part of the sensing cycle. This operation is effective to rock the cam shaft 510 one increment, and hence render disabling lever 573 (FIG. 13) effective to disable latch 565. Incidentally, this sensing cycle for the first order of the machine (except for return of the multiplier carriage to its first escaped position) is an idle machine cycle between the operation of the override pawl and override bail to unlatch the multiplication mechanism, as already described, and the actual initiation of a squaring operation. In later cycles this sensing operation takes place in the carriage shifting cycle.

3. ORDINAL CONTROL OF THE SENSING MECHANISM

It has already been mentioned that the determination of the order in which the sensing mechanism is to be effective is controlled by the angular position of the cam shaft 510. Normally this shaft lies in the angular position shown in FIGS. 7, 13, 14 and 16, and is rocked in each multiplier carriage shifting cycle a single increment of 36° (in a ten-order keyboard, as illustrated). The incremental rotation is provided by the mechanism shown principally in FIGS. 11 and 12, and results from the operation of the sensing shaft 543 and the sensing bail 530. The feed mechanism comprises a ratchet wheel 601 rigidly mounted on the shaft 510, preferably adjacent the right-hand bracket 511 (which, it will be recalled, is mounted on the right frame plate 42). The ratchet wheel is held in an adjusted position by a holding pawl 602 pivotally mounted on the bracket 511 by any suitable means, such as pivot stud 603. This pawl is biased into engagement with the teeth of the ratchet wheel 601 by a suitable spring 604 tensioned between an ear 605 on the pawl which is adapted to engage the ratchet teeth of wheel 601 and an ear formed on the bracket member 511. The wheel is given one increment of rotation with each operation of the sensing bail 530 by means of a feed pawl 606, which is pivotally mounted on a rockable arm 607 that is loosely mounted on a pivot stud 608. The connection between the feed pawl 606 and the supporting arm 607 is preferably that of a pin-and-slot connection, such as that formed by a pin 609 mounted on the arm 607 embraced within a slot 610 in the feed pawl (as shown in FIG. 12). The forward end of the feed pawl carries an ear 611 adapted to engage the ratchet teeth of ratchet wheel 601 as the feed pawl is moved forwardly (to the right in FIG. 12). Preferably it also carries a second ear 612 adapted to engage the wheel 601 as the feed pawl completes its forward stroke, so as to prevent overthrow of the ratchet wheel 601 and the cam shaft 510. A suitable spring 613 biases the feed pawl to an elevated position in which the ear 611 engages the ratchet wheel 601. A second spring 614 biases the supporting arm 607 rearwardly so that the pin 609 engages the rear end of the slot 610. A third spring 615 tensioned between a stud 616 on the feed pawl 606 and a seat on a rearward extension of the bracket 511 holds both the feed pawl and the supporting arm at the extreme rearward position shown.

Normally the sensing bail 530 lies in the forward portion of the slot 514 (as shown in FIG. 11), in which position the ear 611 is in engagement with one of the ratchet teeth of the wheel 601, and the second ear 612 blocks further rotation of that ratchet wheel, as shown in this figure. When the sensing bail is retracted, as it is when the program latch 585 is rocked to its disengaging position, the bail 530 moves from the position shown in FIG. 11 toward that shown in FIG. 12. It can be noted that the position of the bail in FIG. 12 is that assumed when the sensing mechanism senses a "0" value in the controlling order of the keyboard, i.e., it is the full limit of the throw of the bail 530. However, when sensing a value of "9," which is the minimum extent of the throw of this bail (shown in dotted line position in FIG. 12), the feed pawl 606 and its supporting arm 607 have been rocked rearwardly to substantially the full extent of their throw—this throw being limited shortly thereafter by an ear 617 on the arm 607 engaging the under edge of the bracket 511. Even with the minimum extent of movement resulting from sensing a value of "9," the feed pawl 606 will have moved more than one tooth space of ratchet 601. Then, as the bail returns toward its original position shown in FIG. 11, it (the bail) engages the arm 607, pushing it forwardly to the position shown in FIG. 11. The spring 614 is of sufficient strength to pull the feed pawl 606 forwardly with the rocking of arm 607, and hence is effective to rotate the ratchet wheel 601 a single increment—preferably 36° in a ten-order machine.

It has been mentioned before, but it should be mentioned again, that the sensing shaft 543 is released from its program latch 585 (FIG. 5) late in the cycle in which the operative multiplier segment 260 returns to its "0" position and rocks the shift control lever 366 to depress the hook link 370. This immediately releases the sensing shaft 543 and the bail 530 is retracted rearwardly (to the left in FIG. 11) as far as is permitted by the operation of the operative one of the sensing mechanisms. In the next cycle, which is the one utilized for shifting the carriage from one ordinal position to another, the bail 530 is restored to the position shown in FIG. 11, thereupon rocking the cam shaft 510 and all of the cams mounted thereon to the next angular position. During this forward stroke, the sensing slides 520 (FIG. 13) have been allowed to move forwardly to their inoperative position from the force of their springs 524. As this shifting cycle ends, therefore, the sensing bail has returned to its original inoperative position, and is latched in that position by the latch 585, and the cam shaft 510 has been rotated a single increment to place the next higher order sensing mechanism in operative condition. In the meantime, however, the value sensed in the operative order (which is the first order to the left of that which was controlling the preceding ordinal series of operations) has been set into the highest order multiplier segment 260, so that this segment can control the operation of the multiplying mechanism in the next series of ordinal operations.

The means for setting the sensed value into the highest order multiplier segment 260 will be described in the next section. In the meantime it should be remembered that following the preliminary lost motion of bail 530 with respect to the sensing slides 520 (as shown in FIGS. 13 and 14), the shaft 543 will have an angular position determined by the extent of movement allowed bail 530, as determined from the engagement of one of the ears 522 or 523 of the sensing slide with the associated cam face 512 or 513 of the value representing members 509. It should also be kept in mind that the amount of this differential movement of bail 530 (after the lost motion permitted by the spacing of hook 533 from bail 530), and consequently the differential angular rotation of shaft 543 (after such lost motion) is inversely proportional to the value sensed, i.e., it is greatest for a value of "0," is only a single increment for a value of "8," and none for a value of "9."

4. MECHANISM FOR SETTING THE SENSED VALUE INTO THE MULTIPLIER SELECTION SEGMENT

The mechanism for setting the sensed value in the highest order selection segment is shown in FIGS. 5, 9 and 18. As shown in FIGS. 9 and 18, the setting rocker 545 extends upwardly from the shaft 543 and the forward edge of its upper arm is provided with an arcuate cam face 623 adapted to engage the roller 410 carried by the resetting segment 411 when the multiplier carriage is escaped between one and two orders to the left, as it is in a squaring operation. The arm 545, and particularly the arcuate face 623, is so designed that at the minimum extent of throw, which occurs when sensing a value of "9," the lower end of the cam face 623 will just engage the roller 410, and hence will not rock the segment 411 or the restore bail 416. However, if sensing a value of "0," in which case the arm 545 is permitted its extreme throw, such rocking of the restore arm 545 will rock the gear segment 411, and consequently the gear segment 415 and restore bail 416, to the extreme forward position in which the bail 416 engages the spoke of the multiplier segment 260 in the position of the segment shown in FIG. 9, and thereby prevents it from moving when released by its "0" latch. The clearing bail 416 is latched in the adjusted position for a single cycle operation by the latching means shown in FIG. 5. Conventionally, the left end of the bail 416 is supported by a single arm, or spoke, keyed to the shaft 262 to which the gear segment 415 is also keyed. In the present invention the clearing bail 416 is supported on one of the spokes that forms the ratchet latching segment 624. Obviously this ratchet segment 624 assumes an angular position determined by the positioning of the bail 416. The ratchet teeth of the segment provide means for latching it in an adjusted position from the engagement of an ear 625 carried by a latching arm 626. The latching arm is pivotally mounted on the multiplier carriage frame 261 by any suitable means, such as by a rivet, or stud, 627, and is biased to a disengaging position by a weak tension spring 628 tensioned between the lower end of the latch lever 626 and a seat formed in the multiplier carriage frame. The latch arm 626 is moved against the tension of its spring 628 to enable its ear 625 to engage one of the ratchet teeth on segment 624 from the rocking of the bail 468. It will be recalled that this bail is resiliently biased to an operative position (counter-clockwise in FIGS. 5 and 15 or clockwise in FIG. 18) by the spring 469. This spring is sufficiently strong to overcome spring 628, so that the rocking of the bail 468 will resiliently bias the latch 626 into its operative position. This is accomplished by means of the ear 471 (FIGS. 5, 17 and 18) extending to the right at the right end of bail 468. This ear engages a corresponding ear 629 formed at the upper end of the latch lever 626. Thus, the rocking of the bail 468 from the force of its spring is sufficient to position the latching arm in operative relationship in all except the home, or "0" value, position of the operative multiplier segment 260. When this segment is in its "0" position, as shown in FIG. 5, a pin 630 carried by the spokes of this segment engages the latch arm 626 to rock it (clockwise in FIG. 5) against the force of spring 469 (FIG. 15). The latch 626 is effective to hold the ratchet segment 624 in the adjusted position for a single cycle of operation, by which time the segment holding pawl 357 and feed pawl 358 (FIG. 8) have been rendered operative by the rocking of shaft 355, and, therefore, are holding the gear segment 260 in its adjusted position.

During the succeeding cycle of operation, the latch 626 is released, and is operated and released in each succeeding cycle until the multiplier segment is restored to its "0" position. The mechanism for this purpose is shown in FIG. 15. It is operated by a cam 635 mounted on the left end of the main drive shaft 112. The periphery of the cam 635 is engaged by a follower roller 636 mounted on the upper end of a vertical arm of a bellcrank follower 637. This bellcrank is mounted on any suitable pivot stud 638 secured to the left-hand control plate 45, and is biased into engagement with the cam (in a counter-clockwise direction in FIG. 15) by any suitable spring 639 tensioned between a seat on the horizontal arm of the bellcrank and the pivot stud 493, which rotatably supports the setting arm 492. The upper arm of the bellcrank 637 pivotally supports the rear end of a forwardly extending control link 640, which is mounted thereon by any suitable means, such as pivot pin 641. The link 640 is also pivotally mounted on a rocker 642, at an intermediate portion of its length, as by means of pin 643. The rocker arm 642 is pivotally mounted on the left side control plate by any suitable means, such as pivot stud 644. The forward end of the link 640 is offset to provide a forwardly extending arm 645 lying immediately adjacent the extension 467 of bail 468. The forward end of this offset arm is formed as a hook 646 adapted to engage the pin 472 on the extension 467 of bail 468.

As the cam 635 rotates from its home position shown in FIG. 15, and the cam follower is unlatched, as will be explained in the next paragraph, the spring 639 rocks the bellcrank 637 (counter-clockwise in this figure) as permitted by the rotation of the cam. This pulls the link 640 rearwardly, and at the end of its stroke the hook 646 engages the pin 472 and rocks the bail 467, 468 (clockwise in this figure). Such rocking of the bail 468, as shown in FIG. 5, rocks the ear 471 (clockwise in FIG. 5) away from the ear 629 on latch arm 626, whereupon the spring 628 rocks the latch 626 to a disengaging position. When this happens, the latch segment 624, restore bail 416 and gear segment 415 (FIG. 9) are released to the force of spring 417, and the restore bail snaps back to its home position. As the cam returns to its full-cycle position shown in FIG. 15, the link 640 is translated forwardly, whereupon the hook 646 releases pin 472 and spring 469 rocks the bail 467, 468 counter-clockwise to again bias the latching arm 626 into engagement with the rack segment 624, which is now in its home position shown in FIG. 5.

Normally the bellcrank follower 637 and link 640 are latched in their forward inoperative positions by means of a floating latch link 650 (see FIG. 15), which is mounted on the link 640 by any suitable means, such as pivot stud 651. This latch link 650 is biased into an upper position by a suitable spring 652 tensioned between the forward end of the link and the upper arm of a U-shaped lever 653. The link 650 is formed with a shoulder 654 which is adapted to engage a pin 655 mounted on the left-hand control plate 45, when the link is in its forward and upper position. This latching link is depressed to release the latch formed by cooperating shoulder 654 and pin 655 by the rocking (counter-clockwise in FIG. 15) of the U-shaped lever 653, the upper arm of which engages a pin 657 riveted on the forward end of link 650. This lever is keyed to, or otherwise rigidly mounted on, a shaft 656. In the Friden patents above-mentioned, the shaft 656 and the U-shaped lever 653 are rocked directly from depression of one of the multiplier control keys 251, 252 or 253. In later machines, the shaft is rocked in a multiplication operation, in the first cycle of machine operation by means of the automatic left shift and register clearing control mechanism previously described—the operating linkage of which is not shown in these drawings but is adequately described in various patents, such as Ellerbeck, No. 3,000,557 issued Sept. 19, 1961, relating to this type of multiplier mechanism. In either type of construction, the lever 653 is rocked, either by direct depression of the multiplier control keys or in the first cycle of operation, and is held in the rocked position until the operation is completed. The rocking of the lever 653 (counter-clockwise in FIG. 15) depresses the forward end of the latching link 650 so that its shoulder 654 is released from the pin 655, and is thus held in the released position throughout any multiplication operation. Thus, the cam follower 637 is free to follow the positioning of cam 635, and does so continuously throughout any multiplication operation. However, in ordinary multiplication operations, the link 640 and latch 650 reciprocate idly as the bail extension 467 is held in its inoperative position by the engagement of roller 465 with the nose 470.

The operation of the cam follower 637 is also effective to release the "0" latch of the highest order multiplier segment 261. It has been mentioned that the forward end of the link 640 is supported by a rocker arm 642, which obviously must rock simultaneously and in the same direction as the follower arm 637. Associated with the rocker 642 is an upwardly and forwardly extending link 663, the upper end of which is provided with a notch 664 that embraces a stud 665 riveted to the left-hand control plate 45. This link carries a roller 666 spaced a short distance above the upper edge of the forward arm of the rocker 642, so that at the end of the stroke of the rocker 642 it engages the roller 666 and lifts the link 663 slightly. The lower end of the link 663 is supported on a pin 667 which is riveted on, or otherwise rigidly secured to, a "0" latch releasing bail 668 (see FIG. 5). The bail 668 is pivotally mounted on the shaft 210 and lies between the left-hand control plate 45 and the intermediate supporting plate 46. When rocked (clockwise in FIG. 5), it engages the lower end of the "0" latch 263. Thus, the lifting of the link 663 and consequent rocking of bail 668 is effective to rock the "0" latch 263 (counter-clockwise in FIG. 5) and thereby release the highest ordinal segment 260. When thus released, the segment 260 is moved by its spring to the position determined by the restore bail 416 and the value from the operative order of the keyboard is thus set in the multiplier segment.

Link 663 normally assumes its lower position and the bail 668 its counter-clockwise position shown in FIG. 5 from the force of gravity acting upon these parts. However, it will be understood that if desired it would be a simple matter to provide a suitable spring to bias this assembly to the inoperative position shown.

It is seen in FIG. 5 that the bail 668 is provided with a rearwardly extending tail 669. It is also seen that the power arm 590 for the sensing shaft 543 has a forwardly extending tail 675 at the forward, or free, end of which is an ear 676. It is obvious that the tail 675 and ear 676 will assume an angular position representative of the value to be inserted in the multiplier mechanism under the control of the sensing mechanism. When sensing a "0" position which enables the arm 590 and shaft 543 to rock to its extreme position (clockwise from that shown in FIG. 5), the ear 676 will immediately overlie the tail 669 of the bail 668 and thereby prevent rocking of the bail 668, and hence prevent release of the "0" latch 263 at that time. In this event the highest order segment 260 is held in its "0" position, and, therefore, will immediately control an additional shift of the product register carriage 50. Whenever the rocking of bail 668 is blocked by the engagement of tail 669 with ear 676, the rocking of rocker 642 (FIG. 15) is blocked short of its full stroke and spring 639 yields. This results from the fact that the shift control arm 366 is held in the rocked position shown in FIG. 5 to enable an immediate release of shaft 372, and hence initiate an additional carriage shift. Such shifts continue until a value is inserted in the highest order segment 260 or until the sensing mechanism has been operative throughout all of the orders of the main keyboard. When the sensing mechanism has sensed all of the orders of the main keyboard, the cam shaft 510 returns to its original angular position shown in FIG. 7, and the squaring mechanism is restored to its original position, as will be described in Section 6, "Restore Mechanism."

It is also seen in FIGS. 5 and 18 that the squaring control lever 496 carries an upwardly and rearwardly extending arm 685. In the normal position of the parts shown in FIG. 5, the free end of this arm 685 engages a pin 686 mounted on the lower end of a latch lever, or rocker, 687. This latch is pivotally mounted to lever 376 by any suitable means, such as pivot stud 688, and is biased (counter-clockwise in FIG. 5) to an inoperative position by means of a suitable tension spring 689. The upper end of this latch lever is provided with a forwardly extending shoulder 690 normally overlying an ear 670 extending laterally from the rear end of the tail 669. When the lever 496 is in the normal rearward position shown, the arm 685, through its engagement of pin 686, holds the latch lever 687 rocked (clockwise in this figure) against the tension of its spring 689. In that situation the shoulder 690 on the latch lever overlies the ear 670 on the tail 669 and hence prevents rocking of the tail and consequently of bail 653 sufficiently to release the "0" latch 263. However, when the left end of the control lever 496 is rocked forwardly (counter-clockwise in FIG. 18), the bracket 685 releases the latch pin 686. Consequently the latch lever 687 can rock (counter-clockwise in FIG. 5), so that the shoulder 690 is moved rearwardly of the ear 670 and hence the bail 668 is free to rock and release the "0" latch 263.

5. MULTIPLIER CARRIAGE ESCAPEMENT AND SHIFT CONTROL

It has already been mentioned that in the operation of the mechanism of the present invention it is preferred to release the multiplier carriage escapement mechanism to enable the multiplier carriage 261 to shift almost two full orders to the left. It has also been indicated that during a squaring operation, the normal multiplier carriage shift mechanism described in connection with the mechanism shown in FIG. 9 is disabled. Actually the multiplier carriage is permitted to escape almost two full orders to the left in the first cycle of operation and thus prior to the initiation of the multiplication phase. Then, in the first cycle of operation following the operation of the override pawl and override bail 244, the multiplier carriage is shifted one partial step to the right, so that the value standing in the lowest order of the keyboard keys 80 can be set in the highest multiplier segment 260, whereupon the actual operation of squaring can be initiated. It is to provide the necessary sensing cycle that the multiplier carriage escapement mechanism is operated to let the carriage escape almost two orders to the left. At this time the multiplier segment 260 aligned with the ear of shift control lever 366 (FIG. 5) stands at "0," so the lever 366 remains in its shift-controlling position shown in FIG. 5 and immediately initiates a shift operation. However, in a squaring operation the usual shift of the register carriage 50 is blocked, as will hereafter be described in Subsection (c) below. Then, in this sensing cycle that is initiated by the rocking of the override pawl 244, the multiplier carriage is shifted back the partial step to the first ordinal position, and simultaneously the sensing operation takes place to set the value into the highest order multiplier segment 260. The control of the multiplier carriage escapement and shifting mechanism falls under three main headings: (a) original release of the escapement mechanism; (b) enabling the partial multiplier carriage shift during the first sensing cycle; and (c) blocking the multiplier carriage shift out of operation during the balance of the squaring mechanism. These mechanisms will now be discussed in sequence.

(a) *Release escapement mechanism.*—It will be seen by reference to FIG. 15 that the rocker arm 642, which is operated in each cycle of operation by means of the cam 635 and cam follower 637 during every multiplication operation, carries an upwardly extending pusher link 701 which is pivotally mounted thereon by any suitable means, such as the pivot stud 702. It has at its upper end a shoulder, or face, 703 adapted to engage the under edge of the escapement control arm 266. Lifting of the free, or left, end of the escapement control arm, or latch, 266 releases the escapement mechanism and permits the carriage to escape to the left. It was mentioned in connection with the section on the squaring control key 450 and its related mechanism that the movement of the key to its forward position rocks the bail 476 (see FIG. 18) to rock a latching shoulder 477 into the path of travel of the left end of the multiplier segment carriage 261, and thus to block the escapement of that carriage after escaping almost two full orders. Normally the pusher link 701 is held in a rearward inoperative position (counter-clockwise from that shown in FIG. 15) by the engagement of its forward edge with a pin 704 carried on the lower bifurcation 459 of the control slide 452. A spring 705 tensioned between this pin and an ear projecting from the rear edge of the pusher link resiliently biases the link forwardly, so as to underlie the escapement control latch 266, when the key 450 is set to the squaring position shown in FIG. 15. Then, when the rocking of the U-shaped lever 653 forces latch 650 off of its associated pin 655 to release the cam follower 637, the reciprocation of the link 640 is effective to cyclically oscillate the rocker 642. This forces the link 701 upwardly to release the escapement latch 266, and this operation is effected cyclically so long as the register carriage 50 is shifting to the left to the home position for multiplication. Such operation of the carriage escapement latch 266 is of no effect, however, as the carriage is latched in its extreme position for squaring by the bail 476, as already described.

When, however, the actual squaring operation is initiated by the release of the spring-powered control lever 337 by the rocking of its latch 335, which results from the operation of the override bail 244 (FIG. 3), the pusher 701 is disabled. It is seen in FIG. 15 that the latch member 335 carries a second extension 710 upon which is secured a stud 711. This stud is engaged by the sole, or bottom edge, 712 of a control arm 713. This arm 713 is bent, as shown in FIG. 15, and preferably is pivoted on the stud 644. At its elbow the control arm 713 carries a pin 714 which is embraced within a slot 715 formed in the pusher link 701. This pin-and-slot connection 714, 715 obviously supports the upper end of the pusher link 701 and controls whether or not its shoulder 703 underlies the escapement latch 266. When the latch 335 is rocked (counter-clockwise in FIG. 15), the pin 711 lifts the arm 713, thereby rocking the escapement link 701 (counter-clockwise in this figure), so that its shoulder 703 lies behind, or to the left of, the escapement latch 266. This latch 335 remains in the (counter-clockwise) rocked position because the pin 336 on arm 337 engages the forward edge of the latch until the arm 337 is restored to its normal ineffective position at the end of a multiplication operation. Thus, the escapement control link 701 is held disabled until the operation is completed.

(b) *Partial multiplier carriage shift.*—In view of the fact that the multiplier carriage is escaped almost two orders to the left at the start of the carriage shifting operation, and at this time no value stands in the multiplier segments 260, the release of the control latch 337 is effective to immediately initiate operation of a multiplier carriage shift. This results from the fact that the shift control lever 366 (FIG. 5), through its engagement with the aligned segment 260, which stands in the "0" position shown, is held in the counter-clockwise position shown in this figure. Thus, the hook link 370 is effective to release the latch 373. Consequently the shaft 372 is rocked, the rocking of which shaft normally controls the shifting of the multiplier carriage 261 and the product register carriage 50. The rocking of this shaft and the arm 396 (FIG. 7) carried thereby is effective to initiate the required multiplier carriage shift to give the idle cycle required for the first operation of the sensing mechanism. As this shift control of the multiplier selection carriage 261 is conventional and has already been described, it need not be described again. However, in this instance it is desired to disable the shift of the product register carriage 50, so that it will remain in its home, or extreme left-hand, position shown in FIG. 1. This is controlled by a latch arm 720 (see FIGS. 7, 10 and 18). Preferably this latch is pivotally mounted on the stud 499 which also forms the pivot of the control member 498. The latch is biased to the latching position shown in FIG. 7 by a spring 721 tensioned between an ear on the latch lever and a portion of the bracket 511. The latch lever 720 carries an ear 722 which engages the rear edge of the control member 498. When the control member 498 is in its normal and inoperative position (the counter-clockwise position shown in FIG. 10), the engagement of its rear edge with the ear 722 rocks the latch to a disabling position (counter-clockwise from that shown in FIG. 7). However, when the control member 498 is rocked (clockwise from the position shown in FIG. 10 to the position shown in FIGS. 7 and 18), the spring 721 will rock the latch lever 720 to the clockwise latching position shown in FIG. 7.

In this position a shoulder 723 engages a pin 724 riveted to the carriage shift control bail 389 (see also FIG. 3), thus holding the bail in the right-hand position shown in FIG. 3 and thus holding the arm 385 at the right end of the bail in its right-hand and inoperative position. Thus, when the latch 720 is enabled, the shift operating arm 385 is held away from pin 390 and is thus ineffective to control the right shift clutch 151. Therefore, the carriage shift is disabled until the latch 720 is rocked to its releasing position.

The latch 720 is released in the idle sensing, or multiplier carriage shifting, cycle that follows the rocking of the override bail 244. It will be recalled that the sensing mechanism includes the bail, or bar, 530, which, in this cycle, is moved rearwardly from the position shown in FIGS. 7 and 11 toward the extreme position shown in FIG. 12. This bar 530 can move only as far as is permitted by the operative one of the ordinal sensing slides 520, in this instance, the first order. If it should happen that "0" is the value in the first, or lowest order, the bar 530 goes to the extreme, or "0", position shown in FIG. 12. Such a movement of the sensing bail 530 rearwardly (to the extreme right end of the slot in which bail 530 moves, in FIG. 7) enables it to engage the forward end of the latch 720 and thus rock the latch immediately (counter-clockwise in this figure). Thereupon the shoulder 723 releases the pin 724, and the bail 387 is permitted to snap to the left under the force of its compression spring 388, for the multiplier carriage will be in process of being shifted from its extreme squaring position to the first ordinal position. Thereafter the pin 724 will engage the latch to the left of the shoulder 723 and prevent the latch from being effected to control the shifting operation. If, on the other hand, any value other than "0" stands in the lowest order of the keyboard, the movement of the bar 530 will not be sufficient to rock latch 720. However, in this instance a release of latch 720 can be delayed as the machine will, in the next cycle, be operating under the control of multiplier segment 260. In this case the release of the latch 720 is delayed until the return stroke of bail 530, which is effective to rock cam shaft 510, as previously described. This first incremental rocking of shaft 510 is effective to disable the multiplier carriage shift mechanism (as will be described in Subsection (c) below). For the present, it can be noted that movement of a slide 730 from the effect of rocking shaft 510 and its cam 731, causes a pin 736 to rock latch 720 to its releasing position.

(c) *Disable multiplier selection carriage shift mechanism after the initial shift just described.*—It will be recalled that normally the rocking of the shaft 372 and its arm 396 (clockwise in FIG. 7) enables the shift control bail 397 (FIGS. 7 and 19), which is powered by springs 400 and 403 to follow; and that the rocking of the bail 397 is effective to lift the shift control arm 395 (FIG. 9) and thus initiate a shifting operation of the multiplier carriage 261. In the squaring operation this shifting mechanism for the multiplier carriage is disabled during the idle, or sensing, cycle of operation. This is readily accomplished by means of a disabling slide 730 (FIG. 7). The forward end of this slide can be mounted on any suitable means, such as bracket 511, by a stud 735. The rear end of slide 730 is slotted, as at 732, to embrace the pin 399 which extends to the right from the bail 397 to underlie the arm 396 secured to the shaft 372. The forward end of the slide 730 forms a cam sensing nose 733 adapted to engage the periphery of the notch cam 731 (see also FIG. 16). When the cam shaft 510 is in its home position shown in FIGS. 7 and 16, the nose 733 of the control slide 730 lies in the notch 734 of the cam (as shown in FIG. 7). However, as the shaft 510 is rotated its first angular increment, the shoulders of the notch 734 force the slide 730 rearwardly. In this position the bottom of the notch 732 engages the pin 399 and holds it in the position shown in FIG. 7. Thereafter, the rocking of the arm 396, which is fastened to the shaft 372, cannot control a shift of the multiplier carriage because the pin 399 and hence bail 397 are held in the inoperative position shown by the slide 730. It is only when the squaring operation has been completed, which occurs in our preferred form of invention only after the sensing mechanism has been operated to sense a value in all orders of the keyboard and the shaft 510 returns to its original position, that the pin 399 is released by the slide 730. Then, as the squaring operation has been completed and the multiplier carriage shift mechanism has been again enabled for operation, the multiplier carriage can be shifted to its home position and the operation terminated.

It will be understood that the rocking of the shaft 372 will control the operation of the carriage shifting mechanism, as has been outlined under the heading of "Multiplying Mechanism" above. Thus, the rocking of the shift control lever 366 (FIG. 5) operates latch 373 to free levers 375 and 376 to the force of their springs. This disables the multiplier segment feed pawl 358 (FIG. 8) and initiates the carriage shift mechanism. During this operation, the sensing mechanism is operated as the hook link 370 not only operates latch 373, but also the latch bellcrank 585 to release lever 590. The release of lever 590 to the force of springs 591 (FIG. 5) and 544 (FIG. 9) enables rocking of the sensing shaft 543. The rocking of shaft 543 pulls the sensing bail 530 rearwardly (to the left in FIGS. 11 and 12 or to the right in FIG. 13). It will be recalled that the cam shaft 510 was given one increment of rotation in the idle cycle between the operation of the override bail 244 (FIG. 11) and initiation of the multiplication operation, or in the preceding interordinal shift cycle. Thus, the bar 530 can be pulled rearwardly as far as permitted by the sensing slide 520 in the ordinal position determined by the position of shaft 510 and the cams 536 mounted thereon. This sensing takes place during the shifting cycle so that the proper ordinal value is set from the keyboard into the highest order multiplier segment. Thus, as the shift cycle ends, the shift control lever 366 is enabled to drop (rocked clockwise in FIG. 5) if a value has been set in the highest order segment 260. In that event, the hook link 370 is lifted and arms 375, 376 and shaft 372 are latched in the position shown. Then, in the ensuing cycle, multiplication begins as before and continues until the multiplier segment 260 of the highest order of the multiplier mechanism returns to its "0" position.

6. RESTORE MECHANISM

When the carriage 50 has been shifted to the tenth ordinal position (through nine ordinal shifts to bring the tenth order of the counter and register into ordinal relationship with the units order of the keyboard), the shift disabling cam 731 will be returned to the angular position shown in FIG. 7. It will be recalled that the first ordinal sensing cam 536 is in the angular position shown in FIG. 16 at the start of the idle sensing cycle intervening between the operation of the override pawl 244 and the actual initiation of the squaring operation, and that this shaft is given one increment of rotation at the end of that idle cycle. Thus, the second order cam 536 is rotated to the operative position at the end of the idle cycle. Consequently, the tenth order sensing cam is rocked into operative position at the end of the ninth interordinal shifting cycle, i.e., in the shifting cycle preceding squaring under the control of the keyboard. At this time the notch 734 of cam 731 is turned to the position in which it is engaged by the nose 733 of the sensing slide 730. Hence, the slide 730 is pulled forwardly by the spring 721, which, through its action on latch 720, and the camming action of the latch on pin 736, is effective to restore the slide to its normal, inoperative position. By this means, the pin 399 on the bail 397 is released from the lock provided by the slot 732 in the slide 730. Thus, at the start of the tenth ordinal series of operations the multiplier carriage shifting mechanism shown in FIG. 9 is again rendered operative. Therefore, the rocking of shaft 372 at the end of the tenth ordinal series of operations, is effective to shift the multiplier carriage 261 to the right to restore it to its original, inoperative position. When this occurs, an ear 267 carried on the left-hand plate of the multiplier carriage frame 261 underlies the ear on the shift control lever 366, as is customary in the multiplication mechanism of the Friden patents above-mentioned. Thus, the shift control lever is held in its shift-controlling position, and an over-shift is attempted. As is customary in these machines, there is no rack to hold the multiplier carriage 261 in the over-shifted position, but in that position the conventional clearing cam 409 is enabled to engage the roller 410 and clear the multiplier mechanism. This over-shifting cycle is important, as the over-shifting of the multiplier carriage 261, through conventional mechanism, rocks a key latch 254 (FIG. 7) to release the multiplier control key that initiated operation. Thus, the key under the force of its spring is enabled to rise to its inoperative position. Such release of the key enables shaft 210 (FIG. 11) to return to its normal angular position, thereby releasing the rocker 141 to release the pin 140, which controls operation of the clutch 130 and the translation of the switch control link 139. The clutch is thereupon disabled and the motor operation terminated. Simultaneously with this termination of operation and as a result of the release of the control keys, the shaft 656 (FIG. 15) is returned to its normal position shown, thereby enabling the latch link 650 to rise under the force of its spring 652. Thereupon the return of the drive shaft 112 to its full-cycle position shown enables the shoulder 654 of this latch link to engage the stud 655, thereby locking the squaring mechanism in its normal, inoperative position shown. Thus, the release of the control key returns the machine to its normal position, and it is ready for a subsequent operation.

B. *Automatic Squaring Mechanism*

It was indicated previously that our invention could readily take either of two forms: in one of which, as has already been described, the machine is conditioned for conventional multiplication or squaring selectively by the operator by the positioning of the squaring control key 450. In the other embodiment, and one which is actually the preferred form, the control mechanism is automatic in its operation. That is, if a value stands in the multiplier selection mechanism and one of the multiplier control keys is depressed, the mechanism will operate under the control of the conventional multiplying mechanism to multiply the multiplicand standing in the keyboard keys 80 by a multiplier factor inserted in the multiplier keys 250. On the other hand, if no value is inserted in the multiplier value keys 250, the mechanism is conditioned for a squaring operation, so that the subsequent depression of one of the multiplier control keys squares the value standing in the multiplicand keyboard keys 80. The mechanism for automatically controlling the squaring or multiplying operations is best shown by a comparison of the mechanism shown in FIG. 18 with that shown in FIG. 20.

In this mechanism, as best shown in FIG. 20, the bifurcated control slide 450 omits the upper leg, although the lower leg 459 is still required. In this form a strong spring 750 tensioned between a seat formed in the upper leg of the control lever 492 and a stud on the frame plate (not shown) strongly biases the control mechanism to the rear, i.e., the conventional multiplying position. In this form the horizontal control lever 496 is provided with a pin 751 which is adapted to be engaged by a hook member 752 that is mounted on the conventional multiplier carriage escapement bellcrank 265, as shown in FIG. 20. This hook 752 is provided at its outer extremity with a cam face 753 adapted to engage the pin 751 as the carriage is shifted from its first adjusted ordinal position to its home, or inoperative, position. The bellcrank is rocked (clockwise in FIG. 20) positively against the force of its spring 268 by the restoration of the multiplier carriage 261, so that the restoration of the carriage to its home position overcomes the force of spring 750 and rocks the horizontal control lever 496 (clockwise in FIG. 20) to the squaring position. Thus, if the carriage is in its home position when a multiplier control key is depressed, the control mechanism is latched in its squaring position by means of the hook 752 engaging pin 751. If, on the other hand, the carriage has been escaped a single order to the left by the entry of a single multiplier value into the multiplier value keyboard 250, then spring 268 has rocked bellcrank 265 and the hook 752 has moved away from the pin 751, and the control levers 496 and 492 have been rocked to the multiplying position by the force of spring 750.

Means is provided for latching the control mechanism in either the conventional multiplying or in the squaring position. A simple means is shown in FIGS. 20 and 21 and is operated by the rocking of shaft 210 (which, it will be recalled, is rocked by the depression of any one of the multiplier control keys). This latch comprises a latching arm 760 pinned to, or otherwise rigidly mounted on, the left-hand end of the shaft 210. This arm carries a live pawl 761 pivotally mounted thereon by any suitable means, such as stud 762. The live pawl is biased downwardly (counter-clockwise in FIG. 21 and clockwise in FIG. 20) by a suitable spring 763 tensioned between seats formed in the outer end of the pawl 761 and the arm 760. A pin 764 acts as a stop to prevent overrocking of the pawl 761. The end of the live pawl is provided with concentric arcuate faces 765 on the outer edge of the arm and 766 on the inner edge. These faces are adapted to engage a pin 767 carried by an arm 492. Thus, the rocking of the shaft 210 (clockwise in FIG. 20 or counter-clockwise in FIG. 21) forces the live pawl 761 downwardly. The shaft stays in this position throughout the operation, so that the live pawl remains in the adjusted position. If the arm 492 is rocked by its spring 750 to its multiplying position, then the pin 767 is engaged by the inner arcuate face 766 of the live pawl (as shown by the dotted line position of the pin in FIG. 21), and the control mechanism is held in this position throughout the operation. If, on the other hand, at the start of the operation the control lever 496 is latched by its latch arm 752, then the outer arcuate face 765 engages the pin 767 and prevents later adjustment of the control mechanism as the carriage escapes to the left at the start of the operation previously described.

It is believed that the slight differences between the two forms herein described are readily understood and that no greater detail is required to explain the automatic form of the machine.

III. OPERATION

It is believed that, in view of the description of the various mechanisms and their operation, a very short discussion of the operation of the machine will suffice for a complete understanding of it.

The positioning of the squaring key 450 forwardly (FIG. 18) rocks the control lever 496 (counter-clockwise in this figure). In the automatic machine this control lever is latched in the counter-clockwise position by the latch arm 752 which is affixed to the multiplier carriage shifting control bellcrank 265, as shown in FIG. 20. The rocking of this control lever, by means of levers 496 and 498, moves the latch arm 555 (see also FIGS. 7 and 10) forwardly (counter-clockwise in all of these figures), away from engagement with pin 559 on arm 560. This disengagement of the latch arm 555 from the pin on the associated arm 560 releases one of the latches which holds the sensing shaft 543 in a disabled position. The positioning of the control lever 496 in the clockwise position shown in FIGS. 18 and 20, by means of the rocking of member 498 and the cooperation of the ear 722 of latch arm 720 therewith, enables the latch arm 720 to rock from the force of its spring to its latching position in which it is effective to engage the bail 389 which controls the operation of the carriage right shift clutch mechanism from the multiplying mechanism. It is thus enabled to latch this right shift control bail against axial movement to the left when the multiplier carriage escapes in the first cycle of operation, and remains latched until after the first sensing operation is completed.

In the manually controlled embodiment, the movement of the key 450 forwardly to the position shown in FIG. 18 moves the control slide 452 forwardly. The engagement of the pin 458 carried by the slide in the cam slot 460 is effective to rock the arm 461 and hence shaft 475 and bail 476. In the automatic embodiment the movement of the slide 452 is controlled by the rocking of the lever 492 under the force of its spring 750. When the slide is in its forward position shown and the bail 476 is rocked, the rocking of the bail throws the shoulder 477 in the path of travel of the left frame plate of the multiplier carriage 261 and thereby limits the movement of this carriage, when the escapement mechanism is operated, to an ordinal distance of almost two spaces. The carriage is held in this position by the force of spring 268 until it is fed to the first ordinal position in the first operation of the sensing mechanism.

The forward movement of slide 452 has also enabled the rocking of bail 467, 468 from the force of its spring 469 (see FIG. 15), and this is effective, through its ear 471, to resiliently urge the latch arm 626 (FIG. 5) into engagement with its associated rack 624, and thus control the positioning of the restore bar 416 to position the highest ordinal multiplier selection segment 260 until after it is caught and held by the feed pawl 358 and holding pawl 357 (FIG. 8).

After the machine is so conditioned, the depression of any one of the multiplier control keys 251, 252 or 253 is effective to initiate a machine operation by the conventional means, including rocking of shaft 210. The rocking of shaft 210 (by means of the mechanism best shown in FIG. 3) is effective to initiate a continuous left shift of the product register carriage 50 and a single clearing of the operation of the registers, preferably when the carriage reaches the extreme left-hand position. An attempted over-shift of the carriage after it reaches its extreme left-hand position is effective to rock the override bail 244 (FIGS. 3 and 11) which conventionally disables the left shifting mechanism and the clearing mechanism. In our invention it also releases the second control latch for the sensing shaft 543. The bail 244 carries the arm 246 (see FIG. 13), which, when rocked, rocks the latch lever 565 so that it releases the pin 566 on arm 568 affixed to the sensing shaft 543. The rocking of the bail 244 also, by conventional means, initiates the multiplication operation by rocking the latch 335 (FIG. 15) to release the power-actuated arm 337. In this situation, there being no value standing in the multiplier selector mechanism, the machine automatically initiates a single shift of the multiplier carriage in order to provide an idle, or sensing, cycle of machine operation.

During this cycle, the multiplier carriage is shifted one partial order to the right so that it thereafter remains in the first ordinal position, while the register carriage shift is disabled.

The operation of this shifting mechanism is under control of the usual shift control lever 366 (FIG. 5), which, in addition to releasing the shift control shaft 372, also releases latch 585 to enable the follower lever 590 to rock as controlled by its engagement with the cam 593. This enables the operation of the sensing shaft 543 (see FIG. 11) to pull the sensing bail 530 rearwardly as far as is permitted by the first ordinal sensing mechanism. This sensing mechanism is best shown in FIG. 13 and comprises a slide 520 which is pulled rearwardly until one of its noses 522 or 523 engages the differentially stepped abutment faces of the sensing members 512 or 513. Such rocking of the shaft 543 positions the setting arm 545 (FIGS. 9, 18 and 20) in a differential angular position. This positioning of arm 543, operating through roller 410 and the conventional restore gears of the multiplier mechanism, positions the restoring bail 416 in a differential value position. Simultaneously the "0" latch bail 668 (FIG. 5) is operated through means of link 663 (FIG. 15) at it is lifted upwardly from the force of cam follower arm 637 following the contour of cam 635 and the linkage attached to the cam follower, including link 640 and rocker 642. Thus, the highest order selection segment is released from its "0" latch 263 and moves, from the force of its conventional spring, toward its extreme "0" value position until stopped by the differentially positioned restore bar 416. This first sensing operation is effective to disable the multiplier carriage shifting mechanism by means of the mechanism best shown in FIG. 7, and which includes the disabling bar 730, the nose 733 of which is normally seated in a depression 734 of a cam 731 on the main cam shaft 510. The first incremental rotation of the cam shaft and cam pushes the slide 730 rearwardly to latch the pin 399 and its bail 397 against the rocking movement which normally occurs from rocking of shaft 372 (clockwise in this figure). Thus, the multiplier carriage remains in its first ordinal position until the cam shaft 510 returns to its home position during the interregister shifting operation, which occurs after the multiplication operation has been completed under control of the ninth order of the keyboard and before it is initiated under the control of the tenth order thereof. Thus, at the end of the tenth ordinal series of operations the multiplier carriage shifting mechanism has been re-enabled and the multiplier carriage is shifted to its home position, as is customary in machines of this kind.

At the end of each ordinal series of operations, i.e., when the multiplier segment 260 (FIG. 5) returns to its "0" position to rock the shift control lever 366, the product register carriage 50 is shifted one order to the right, as is conventional. During this shifting movement, the sensing mechanism is again rendered operative through the release of latch 585 (FIG. 5) resulting therefrom. Thus, in each interordinal shift cycle the next higher order of the keyboard keys 80 is sensed by the sensing mechanism and the value represented thereby is inserted into the highest order multiplier segment 260. In this manner the multiplication continues from right to left, and, as in this instance, the multiplicand value and the multiplier value are the same, the value set in the main keyboard keys 80 is squared by the machine.

We claim:

1. In a calculating machine having differentially settable selection members, a product register, actuating means for entering a value determined by the selection members into said register, and a multiplying mechanism including a differentially settable selection means for controlling operation of said actuating means to multiply a value set in said selection members by a value set into said selection means, a means for squaring a value set in said selection members which comprises means for sensing the differential value setting of the respective orders of the selection members, means for operating said sensing means to sense the respective selection members in ordinal sequence, and means operated by said sensing means to set said multiplier selection means to a differential position determined by said sensing means.

2. In a calculating machine having a selection mechanism including differentially positionable selection members, a product register, actuating means for entering a value determined by the selection members into said register, and a multiplying mechanism including ordinally arranged and differentially settable multiplier control means, means for restoring an operative one of said multiplier control means from a differentially set to a "0" position, and means operated by the return of said operative one of said multiplier control means to its "0" position to control operation of said actuating means, the combination which comprises a sensing means for sensing the position of the respective selection members, order control means for sequentially operating one only of said sensing means, means operated by said sensing means to set the highest order multiplier selection means to a differential position determined by said sensing means, and means controlled by the return of the highest order control means to its "0" position to also operate said order control means.

3. In a calculating machine having ordinally arranged and differentially positionable selection members, a product register, actuating means for entering a value determined by the selection members into said register, means for ordinarily shifting said product register, and a multiplying mechanism including a differentially settable selection device, means for restoring said device when set to its "0" position, and means operated by the return of said device to its "0" position to initiate operation of the shifting means to shift the product register, the combination which comprises ordinally arranged means for sensing the differential value position of the respective orders of the selection members, order control means for operating said sensing means to sense the selection members in ordinal sequence, means operated by said sensing means to set said multiplier selection device to a differtial position determined by said sensing means, and means controlled by the return of said multiplier selection device to its "0" position for operating said order control means.

4. In a calculating machine having ordinally arranged and differentially positionable selection members, a product register, actuating means for entering a value determined by the selection members into said register, means for ordinally shifting said product register, and a multiplying mechanism including ordinally arranged and differentially settable selection devices, means for incrementally restoring a set device to its "0" position, and means operated by the return of an operative one of said devices to its "0" position to initiate operation of the shifting means to shift the product register, the combination which comprises ordinally arranged means for sensing the differential value position of the respective orders of the selection members, means operated by said sensing means to set the operative one of said multiplier selection devices to a differential position determined by said sensing means, means for sequentially selecting the order of the selection mechanism to be sensed and disable all others, and means for operating said order selecting means to activate the sensing means in ordinal sequence.

5. In a calculating machine having an ordinally arranged selection mechanism including longitudinally and differentially positionable selection members, a product register, a cyclically operable actuating means for entering a value determined by the selection members into said register, means for ordinally shifting said product register, and a multiplying mechanism including ordinally arranged and differentially rotatable selection devices, means for incrementally restoring one of said devices from a differentially rocked to a "0" position during cycles of operation of said actuating means, and means operated by the return of said one of said selection devices to its "0" position to disable said actuating means and to initiate operation of the shifting means to shift the product register, the combination which comprises ordinally arranged means for sensing the differential position of the respective selection members, means operated by said sensing means to adjust the highest order multiplier segment to a differential rotated position determined by said sensing means, and means for operating said sensing means in a predetermined ordinal sequence.

6. In a calculating machine having an ordinally arranged selection mechanism including differentially positionable selection members, a product register, a cyclically operative actuating means for entering a value determined by the selection members into said register, means for shifting said product register, and a multiplying mechanism including a multiplier carriage, ordinally arranged and differentially settable selection devices mounted in said carriage, means for setting said devices to a differential position, means for restoring said devices from a differentially set position to a "0" position co-cyclically with cyclic operation of said actuating means, means for shifting said multiplier carriage, means operated by the return of an operative member to its "0" position to disable operation of said actuating means and initiate operation of the shifting means to shift the product register and normally to shift the multiplier carriage, and means for initiating a multiplication operation, the combination which comprises ordinally arranged means for sensing the differential value position of the respective selection members, adjusting means operated by said sensing means to adjust the highest order selection device to a differential position determined by said sensing means, order selection means for sequentially controlling the order in which the selection member is to be sensed, drive means for operating said order selecting means to activate the sensing means in ordinal sequence, and a control member operable to disable said multiplier carriage shifting means and to enable said sensing means, said adjusting means, and said order selecting means.

7. In a calculating machine having an ordinally arranged selection mechanism including differentially positionable selection members, a product register, actuating means for entering a value determined by the selection members into said register, means for shifting said product register, and a multiplying mechanism including a multiplier carriage, ordinally arranged and differentially settable selection devices mounted in said carriage, means for setting said devices to a differential position, means for restoring said devices from a differentially set position to a "0" position, means for shifting said multiplier carriage, means operated by the return of an operative member to its "0" position to initiate operation of the shifting means to shift the product register and normally to shift the multiplier carriage, and means for initiating a multiplication operation, the combination which comprises ordinally arranged means for sensing the differential value position of the respective selection members, adjusting means operated by said sensing means to adjust the highest order selection device to a differential position determined by said sensing means, order selecting means for sequentially selecting the ordinal selection members to be sensed, a control member positionable in an inoperative position or in an operative one in which it disables said multiplier carriage shifting means and enables said sensing means, said adjusting means, and said selecting means, and a detent means for said control member.

8. The mechanism of claim 7 wherein the control member comprises a manipulatable key.

9. The mechanism of claim 7 wherein the control member is resiliently biased to its inoperative position and the detent means is controlled by said multiplier carriage for holding said control means in its operative position.

10. The apparatus of claim 7 including also means for determining movement of said multiplier carriage away from an inoperative position, and means controlled by said determining means for initiating a normal operation of said multiplying mechanism if the carriage is moved away from its inoperative position and for initiating an operation thereof under the control of said sensing means if the carriage is in its inoperative position.

11. In a calculating machine having an ordinally arranged selection mechanism including differentially positionable selection members, a product register, actuating means for entering a value determined by the selection members into said register, means for shifting said product register, and a multiplying mechanism including a shiftable multiplier carriage, ordinally arranged and differentially settable selection devices mounted in said carriage, means for setting said devices to a differential position and for shifting said carriage from an inoperative to an operative position, means for restoring an operative one of said devices to a "0" position, means operated by the return of an operative member to its "0" position to initiate operation of the shifting means to shift the product register and normally to shift the multiplier carriage in the reverse direction, and means for initiating a multiplication operation, the combination which comprises ordinally arranged means for sensing the differential value position of the respective selection members, adjusting means operated by said sensing means to adjust the highest order selection device to a differential position determined by said sensing means, means for sequentially selecting the ordinal selection members to be sensed, a positionable control member operable in one position to disable said means for moving said multiplier carriage in the reverse direction and to enable said sensing means, said adjusting means and said sequential selecting means, a means for biasing said control member to said one position, and means operable by said carriage in its inoperative position to disable said control member.

12. In a calculating machine having an ordinally arranged selection mechanism including differentially positionable selection members, a product register, a cyclically operable actuating means for entering a value determined by the selection members into said register, means for shifting said product register, and a multiplying mechanism including a shiftable multiplier carriage, ordinally arranged and differentially settable selection devices mounted in said carriage, means for setting said devices to a differential position and for shifting said carriage from an inoperative to an operative position, means for incrementally restoring an operative one of said devices to a "0" position in timed relationship to cycles of operation of said actuating means, means operated by the return of an operative member to its "0" position to disable operation of said actuating means and to initiate operation of the shifting means to shift the product register and normally to shift the multiplier carriage in the reverse direction, and means for initiating a multiplication operation, the combination which comprises ordinally arranged means for sensing the differential value position of the respective selection members, adjusting means operated by said sensing means to adjust the highest order selection device to a differential position determined by said sensing means, means for sequentially selecting the ordinal selection members to be sensed, and a manually positionable control member operable in one position to disable said means for moving said multiplier carriage in the reverse direction and to enable said sensing means, said adjusting means and said sequential selecting means.

13. In a calculating machine having an ordinally arranged selection mechanism including differentially positionable selection members, a product register, a cyclically operative actuating means for entering a value determined by the selection members into said register, means for shifting said product register, and a multiplying mechanism including a multiplier carriage, ordinally arranged and differentially settable selection devices adjustably mounted in said carriage, means for setting said devices to a differential position and for shifting said carriage from an inoperative to an operative position, means for restoring an operative one of said devices to a "0" position co-cyclically with cycles of operation of said actuating means, and means operated by the return of an operative member to its "0" position to disable operation of said actuating means and to initiate operation of the shifting means to shift the product register and normally to shift the multiplier carriage in the reverse direction, the combination which comprises ordinally arranged means for sensing the differential value position of the respective selection members, adjusting means operated by said sensing means to adjust the highest order multiplier segment to a differential position determined by said sensing means, means for controlling operation of said sensing means to sense the ordinal selection members in a predetermined ordinal sequence, and a squaring control key having one position in which it is ineffective to modify operation of said multiplying mechanism and to disable said sensing means and said adjusting means and another position in which it disables the shifting of the multiplier carriage in the reverse direction and enables operation of said sensing means and said adjusting means.

14. In a calculating machine having a selection mechanism including ordinally arranged and differentially settable selection members, a shiftable product register, means for shifting said register ordinally with respect to said selection means, cyclically operable means for entering a value determined by said selection members into said register, and a multiplication mechanism including an array of multiplier selection elements shiftable as a unit, means normally latching each element in a "0" value position, means for adjusting each element to a selected value position, means for incrementally returning an element from an adjusted value position to its "0" position during cycles of operation of said actuating means, and means operated by the return of said adjusted element to its "0" position for initiating operation of the shifting means, the combination which comprises ordinally arranged means for sensing the differential value setting of the ordinally arranged selection members, means operated by said sensing means for adjusting the highest order of said selection elements to a value position corresponding to that sensed, an order determining means including a cam shaft and spirally arranged cams for enabling the operation of one only of said sensing means and means for incrementally rotating said shaft to progressively change the order to be sensed from lowest to highest order, a squaring key, means operated by said key for controlling the leftward escapement of said multiplier selection members and for conditioning the sensing mechanism for operation, an operating key, and means controlled by the operating key for initiating a multiplication operation.

15. In a calculating machine having a selection mechanism including ordinally arranged and differentially settable selection members, a shiftable product register, means for shifting said register ordinally with respect to said selection means, cyclically operable means for entering a value determined by said selection members into said register, and a multiplication mechanism including an array of multiplier selection elements shiftable as a unit, means normally latching each element in a "0" value position, means for adjusting each element to a selected value position, means for incrementally returning an adjusted element from its adjusted position to its "0" position in cycles of operation of said actuating means, and means operated by the return of said multiplier selection element to its "0" position for initiating operation of the shifting mechanism, the combination comprising a control lever having a multiplying and a squaring position, spring means resiliently biasing said control lever into a multiplying position, latching means operated by said array of multiplier selection members in their home position for latching said control lever in its squaring position, a sensing means for sensing the differential value setting of said selection members, means operated by the control lever when in said squaring position for releasing said sensing means for operation, means operated by said sensing means for adjusting the highest order multiplier selection member to a value position corresponding to the value sensed by the sensing means, means including a cam shaft and angularly displaced cams thereon for enabling the operation of one only of said ordinal sensing members, and means for operating said cam shaft with each sensing operation.

16. In a calculating machine having an ordinally arranged selection mechanism including differentially settable selection members, a shiftable register, means for shifting said register in either direction, a cyclically operable actuating means operable to enter a value into said register corresponding to the values standing in the ordinally related selection members, and a multiplying mechanism including a multiplier selection carriage containing ordinally arranged multiplier selection segments, means for entering values into said selection segments, means for escaping said multiplier carriage one order to the left with each entry of values thereinto, shift means for ordinally returning said carriage toward its original position, means for cylically returning the operative one of said selection segments to its "0" position during cycles of operation of said actuating means, means operated by the return of the operative one of said selection segments to its "0" position for initiating operation of said shifting means and said shift means, and a multiplying control key adapted to initiate a multiplication operation under the control of said multiplier segments, a mechanism for squaring a value set into said selection mechanism comprising the combination of ordinally arranged sensing members adapted to sense the differential position of the respective selection members, means operated by said sensing means to set a value sensed by it into the highest order of the multiplier selection segments, means including a shaft and cams angularly displaced thereon for enabling one only of said ordinal selection members to be operative, means for incrementally rotating said shaft so as to successively control operation of said sensing means through successive orders of said selection mechanism, and means for blocking operation of said shift means during a squaring operation.

17. In a calculating machine having a selection mechanism including ordinally arranged and differentially positionable selection bars, and an ordinally arranged keyboard effective to differentially position the coordinal selection bars, the combination which comprises a sensing means for sensing the differential position of the selection bars, and order control means for operating said sensing means to sense said selection bars in ordinal sequence.

18. In a cyclically operable calculating machine having a selection mechanism including ordinally arranged and differentially positionable selection bars, an ordinally arranged keyboard effective to differentially position said selection bars, a multiplier control member differentially settable to a value position to determine the number of cycles of operation of the machine, and power drive means, the combination which comprises a power driven sensing means for sensing the differential position of the various selection bars, power driven order control means for operating said sensing means to sense said selection bars in ordinal sequence, and power driven means operated by said sensing means to set the multiplier control member to a value position corresponding to the value so sensed by said sensing means.

19. In a calculating machine having:
 (1) differentially settable selection members,
 (2) a product register,
 (3) actuating means for entering a value determined by the selection members into said register,
 (4) a drive means for said actuating means, and
 (5) a multiplying mechanism including a differentially settable selection means for controlling operation of said actuating means to multiply a value set in said selection members by a value set into said selection means, a means for squaring a value set in said selection members which comprises:
 (6) means driven by said drive means for sensing the differential value setting of the respective orders of the selection members,
 (7) means driven by said drive means for operating said sensing means to sense the respective selection members in ordinal sequence, and
 (8) means operated by said sensing means to set said multiplier selection means to a differential position determined by said sensing means.

20. In a calculating machine having:
 (1) ordinally arranged and differentially positionable selection members,
 (2) a product register,
 (3) actuating means for entering a value determined by the selection members into said register,
 (4) means for ordinally shifting said product register,
 (5) power driven means for driving said actuating means and said shifting means, and
 (6) a multiplying mechanism including:
  (a) a differentially settable selection device,
  (b) means for restoring said device when set to its "0" position, and
  (c) means operated by the return of said device to its "0" position to initiate operation of the shifting means to shift the product register, the combination which comprises:
 (7) power driven means for sensing the differential value position of the various orders of the selection members,
 (8) power driven order control means for operating said sensing means to sense the selection members in ordinal sequence,
 (9) means operated by said sensing means to set said multiplier selection device to a differential position determined by said sensing means, and
 (10) means controlled by the return of said multiplier selection device to its "0" position for operating said order control means.

21. In a calculating machine having:
 (1) ordinally arranged and differentially positionable selection members,
 (2) a product register,
 (3) actuating means for entering a value determined by the selection members into said register, and
 (4) a multiplying mechanism operable to control operation of said actuating means and including:
  (a) a shiftable and differentially settable selection device, and
  (b) means for manually setting said device and simultaneously shifting it from an inoperative to an operative position, the combination which comprises:
 (5) ordinally arranged means for sensing the differential value position of the respective orders of the selection members,
 (6) means for operating said sensing means in ordinal sequence,
 (7) setting means operated by said sensing means to set said multiplier selection device to a differential position determined by said sensing means,
 (8) means for determining movement of said multiplier carriage away from its inoperative position, and (9) means controlled by said determining means for initiating a normal multiplication operation when said carriage is away from its inoperative position at the time of depression of the multiply key and for initiating operation of said sensing means, said operating means and said setting means when said carriage is in its inoperative position at the time of depression of the multiply key.

References Cited in the file of this patent

UNITED STATES PATENTS

| | | |
|---|---|---|
| 2,764,347 | Ellerbeck | Sept. 25, 1956 |
| 2,801,052 | Haluss | July 30, 1957 |
| 3,000,557 | Ellerbeck | Sept. 19, 1961 |

FOREIGN PATENTS

| | | |
|---|---|---|
| 509,747 | Great Britain | July 20, 1939 |

UNITED STATES PATENT OFFICE
CERTIFICATE OF CORRECTION

Patent No. 3,107,852                                        October 22, 1963

Gilman Plunkett et al.

It is hereby certified that error appears in the above numbered patent requiring correction and that the said Letters Patent should read as corrected below.

Column 6, line 48, for "rachet" read -- ratchet --; column 10, line 59, for "overide" read -- override --; column 11, line 25, for "seleciton" read -- selection --; line 27, for "carrier" read -- carriage --; line 35, after "FIG. 5" insert a closing parenthesis; same line 35, for "valve" read -- value --; same column 11, line 60, for "machanism" read -- mechanism --; column 13, line 64, for "shwn" read -- shown --; column 17, line 65, for "segmnets" read -- segments --; column 19, line 27, for "and", first occurrence, read -- an --; column 21, line 33, for "adaped" read -- adapted --; column 23, lines 31 and 32, for "prdinarily" read -- ordinally --; column 25, line 8, for "reelased" read -- released --; column 28, line 49, for "spokes" read -- spoke --; column 37, line 73, for "selector" read -- selection --; column 39, line 32, for "ordinarily" read -- ordinally --.

Signed and sealed this 20th day of October 1964.

(SEAL)
Attest:

ERNEST W. SWIDER
Attesting Officer

EDWARD J. BRENNER
                                            Commissioner of Patents